United States Patent
Tadano et al.

(10) Patent No.: US 11,632,500 B2
(45) Date of Patent: Apr. 18, 2023

(54) IMAGING DEVICE AND IMAGING METHOD

(71) Applicant: SONY GROUP CORPORATION, Tokyo (JP)

(72) Inventors: Ayumi Tadano, Tokyo (JP); Osamu Izuta, Tokyo (JP); Hiroto Ishikawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/416,929

(22) PCT Filed: Dec. 13, 2019

(86) PCT No.: PCT/JP2019/048879
§ 371 (c)(1),
(2) Date: Jun. 21, 2021

(87) PCT Pub. No.: WO2020/137604
PCT Pub. Date: Jul. 2, 2020

(65) Prior Publication Data
US 2022/0086349 A1 Mar. 17, 2022

(30) Foreign Application Priority Data
Dec. 28, 2018 (JP) ............................. JP2018-246878

(51) Int. Cl.
*H04N 9/73* (2006.01)
*H04N 5/232* (2006.01)

(52) U.S. Cl.
CPC ... *H04N 5/23245* (2013.01); *H04N 5/232935* (2018.08); *H04N 9/735* (2013.01)

(58) Field of Classification Search
CPC ........ H04N 9/73; H04N 9/735; H04N 1/6077; H04N 5/23245
(Continued)

(56) References Cited

U.S. PATENT DOCUMENTS 9,313,304 B1* 4/2016 Haynold ............ H04N 5/23216
2003/0107657 A1* 6/2003 Shioji .................... H04N 5/772
348/231.2

(Continued)

FOREIGN PATENT DOCUMENTS

CN 1925563 A 3/2007
CN 101902578 A 12/2010
(Continued)

OTHER PUBLICATIONS

International Search Report and Written Opinion of PCT Application No. PCT/JP2019/048879, dated Feb. 4, 2020, 14 pages of ISRWO.

*Primary Examiner* — Anthony J Daniels
(74) *Attorney, Agent, or Firm* — Chip Law Group

(57) ABSTRACT

The present disclosure relates to an imaging device, an imaging method, and a program that make it possible to implement an appropriate auto white balance (AWB) lock desired by a user.
As a shutter button setting for applying the AWB lock, any one of Shutter Halfway Down, Continuous Shooting, or Off can be select and set. Furthermore, a setting is configured in which an AWBL button is assigned to a custom button so that the AEB lock can be applied by either a hold operation or a toggle operation. The present disclosure can be applied to an imaging device.

23 Claims, 26 Drawing Sheets

(58) Field of Classification Search
USPC ....................................................... 348/223.1
See application file for complete search history.

(56) References Cited

U.S. PATENT DOCUMENTS

| | | | |
|---|---|---|---|
| 2004/0017594 A1* | 1/2004 | Suekane | H04N 1/6011 358/448 |
| 2005/0235228 A1* | 10/2005 | Hashimoto | G06F 3/0481 715/856 |
| 2010/0302595 A1 | 12/2010 | Yamada et al. | |
| 2017/0180620 A1* | 6/2017 | Takasumi | H04N 5/232939 |
| 2019/0191086 A1* | 6/2019 | Kunishige | H04N 5/232933 |
| 2020/0228727 A1* | 7/2020 | Zheng | H04N 5/23212 |

FOREIGN PATENT DOCUMENTS

| | | | |
|---|---|---|---|
| JP | 2002-290813 A | 10/2002 | |
| JP | 2007-097125 A | 4/2007 | |
| JP | 2008-054130 A | 3/2008 | |
| JP | 2009-081636 A | 4/2009 | |
| JP | 2011-009966 A | 1/2011 | |
| JP | 2011-010275 A | 1/2011 | |
| JP | 4994547 B2 * | 8/2012 | ............... H04N 9/04 |
| JP | 2016-119693 A | 6/2016 | |
| KR | 10-2007-0026059 A | 3/2007 | |
| TW | 200731783 A | 8/2007 | |

\* cited by examiner

FIG. 1
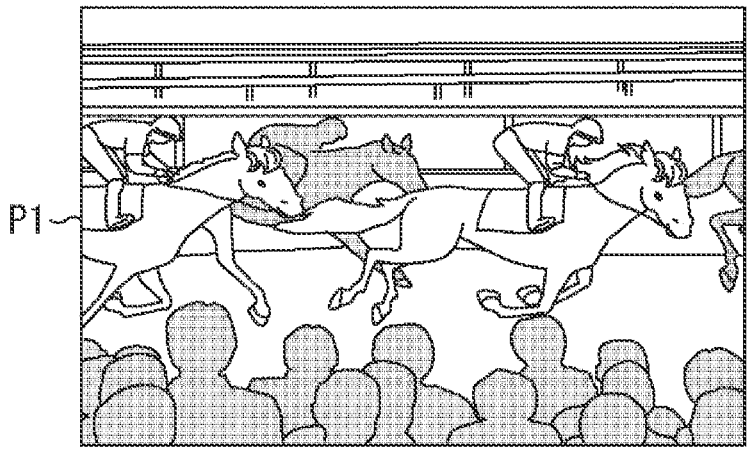
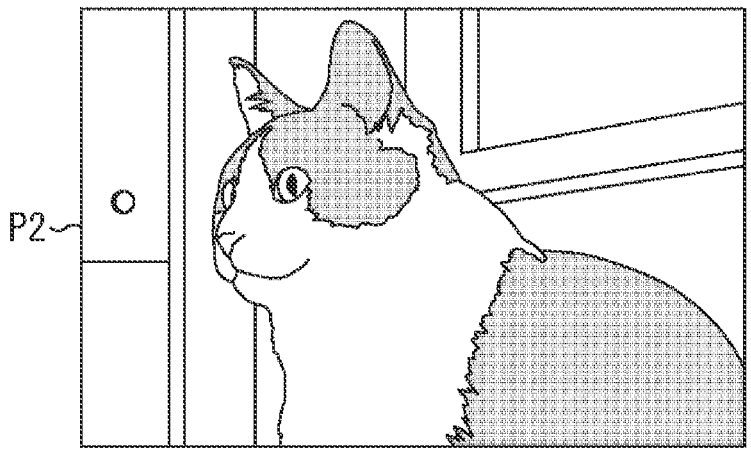
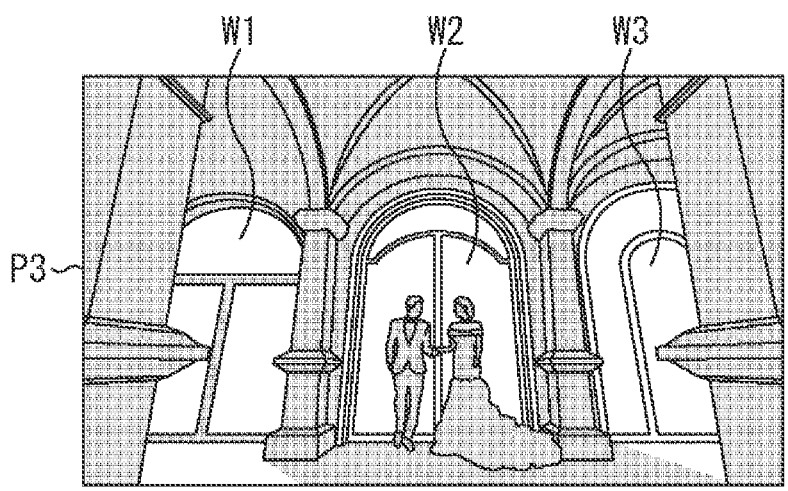

FIG. 2
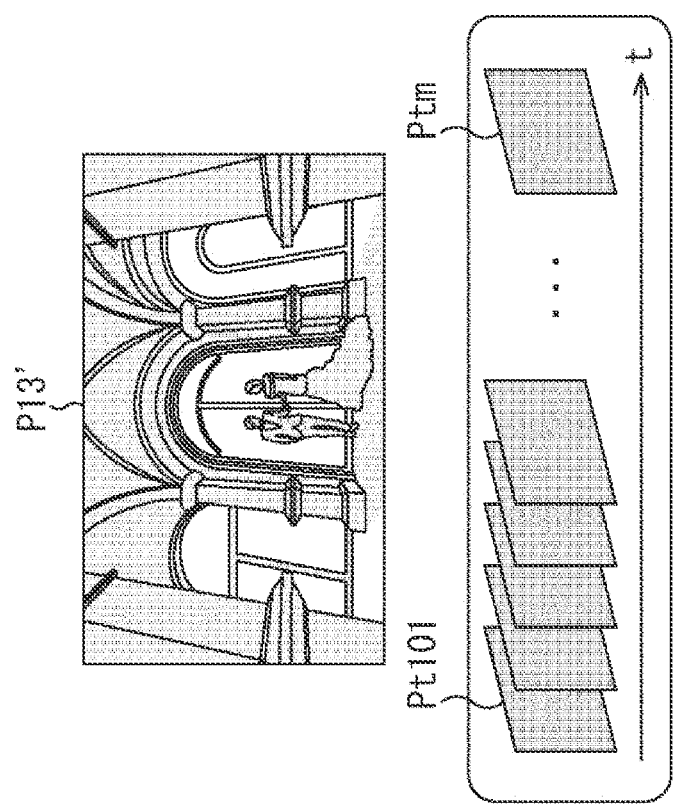
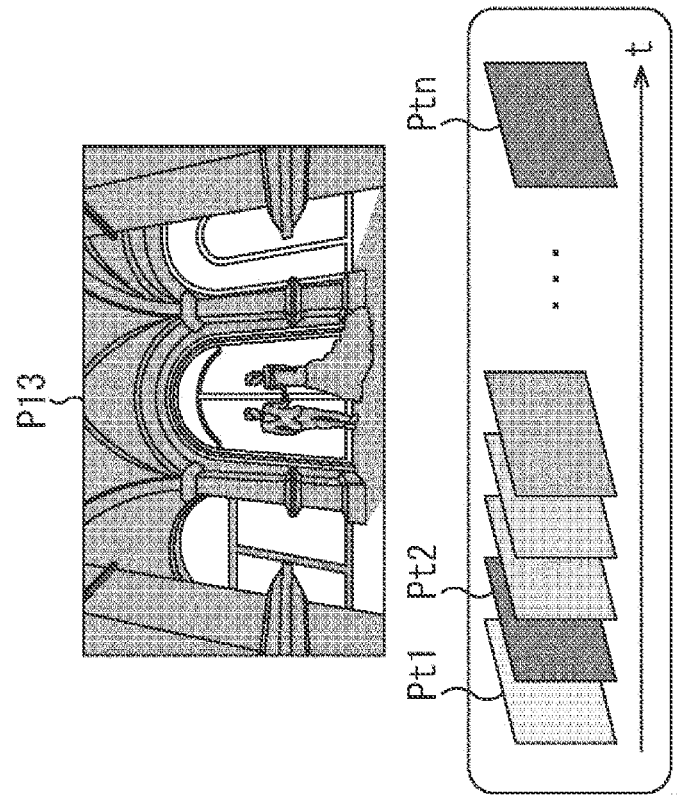

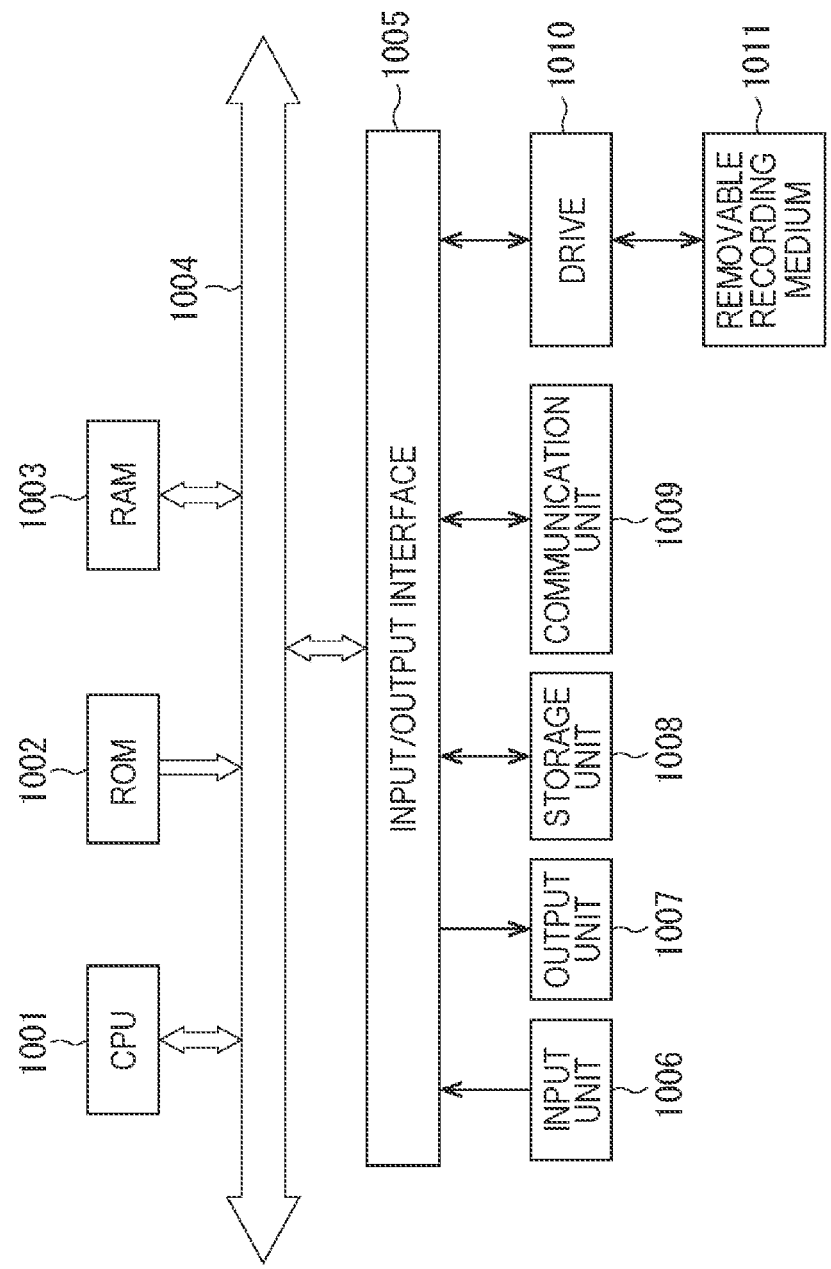

IMAGING DEVICE AND IMAGING METHOD

CROSS REFERENCE TO RELATED APPLICATIONS

This application is a U.S. National Phase of International Patent Application No. PCT/JP2019/048879 filed Dec. 13, 2019, which claims priority benefit of Japanese Patent Application No. JP 2018-246878 filed in the Japan Patent Office on Dec. 28, 2018. Each of the above-referenced applications is hereby incorporated herein by reference in its entirety.

TECHNICAL FIELD

The present disclosure relates to an imaging device, an imaging method, and a program, and more particularly to an imaging device, an imaging method, and a program that make it possible to implement an appropriate auto white balance (AWB) lock desired by a user.

BACKGROUND ART

Imaging devices are provided with a white balance adjustment function for adjusting a white balance of an image to be captured.

The white balance adjustment function generally has two operation modes: a preset white balance mode that adjusts the white balance in accordance with a specific light source set in advance, and an auto white balance mode that adjusts the white balance on the basis of a light condition of an entire image.

In order to implement the function, the white balance requires a variety of settings such as these two operation modes and for which of preset light sources the white balance is to be adjusted.

Thus, in order to implement the white balance adjustment function, it is essential to establish a configuration for making a variety of required settings.

For this reason, a technology for making necessary settings in order to implement the white balance adjustment function has been proposed (see Patent Document 1).

CITATION LIST

Patent Document

Patent Document 1: Japanese Patent Application Laid-Open No. 2002-290813

SUMMARY OF THE INVENTION

Problems to be Solved by the Invention

Incidentally, in a case where the white balance is adjusted in the auto white balance mode (hereinafter, also referred to simply as AWB), an adjustment is made on the basis of the light condition of the entire image, so that a live view image displayed on a monitor continues to change frequently in color temperature in response to a change in the image.

However, it has not been possible for a user to search for a desired color temperature while observing the changing color temperature in the live view image displayed on the monitor while changing a composition and then lock the AWB (hereinafter referred to as AWB lock) to stop the change in color temperature at a timing when the desired color temperature has been reached.

For this reason, it is conceivable to allow the user to lock the AWB in a similar manner to a focus lock by autofocus and an exposure lock by autoexposure while half-pressing a shutter button.

However, it is also conceivable to search for a desired color temperature by checking the change in color temperature due to the AWB while changing the composition.

At this time, when the shutter button is half-pressed, the AWB lock is applied at the same time. This makes it impossible to search for a desired color temperature by changing the composition while checking the change in color temperature.

The present disclosure has been made in view of such a situation, and in particular, makes it possible to implement an appropriate AWB lock desired by a user by allowing an AWB lock operation to be set in accordance with an operation member and an operation content for the operation member.

Solutions to Problems

An imaging device of one aspect of the present disclosure includes an operation member that accepts an input of an operation related to imaging, and a setting unit that configures a setting in such a way that an auto white balance (AWB) lock is operated by a predetermined operation on the operation member.

An imaging method and a program of the aspect of the present disclosure correspond to the imaging device of the aspect of the present disclosure.

In the aspect of the present disclosure, a setting is made in such a way that an auto white balance (AWB) lock is operated by a predetermined operation on an operation member that accepts an input of an operation related to imaging.

BRIEF DESCRIPTION OF DRAWINGS

FIG. 1 is a diagram illustrating white balance adjustment.

FIG. 2 is a diagram illustrating a case in which an AWB is to be temporarily fixed (No. 1).

FIG. 26 is a diagram illustrating a configuration example of a general-purpose personal computer.

MODE FOR CARRYING OUT THE INVENTION

Figure 3:
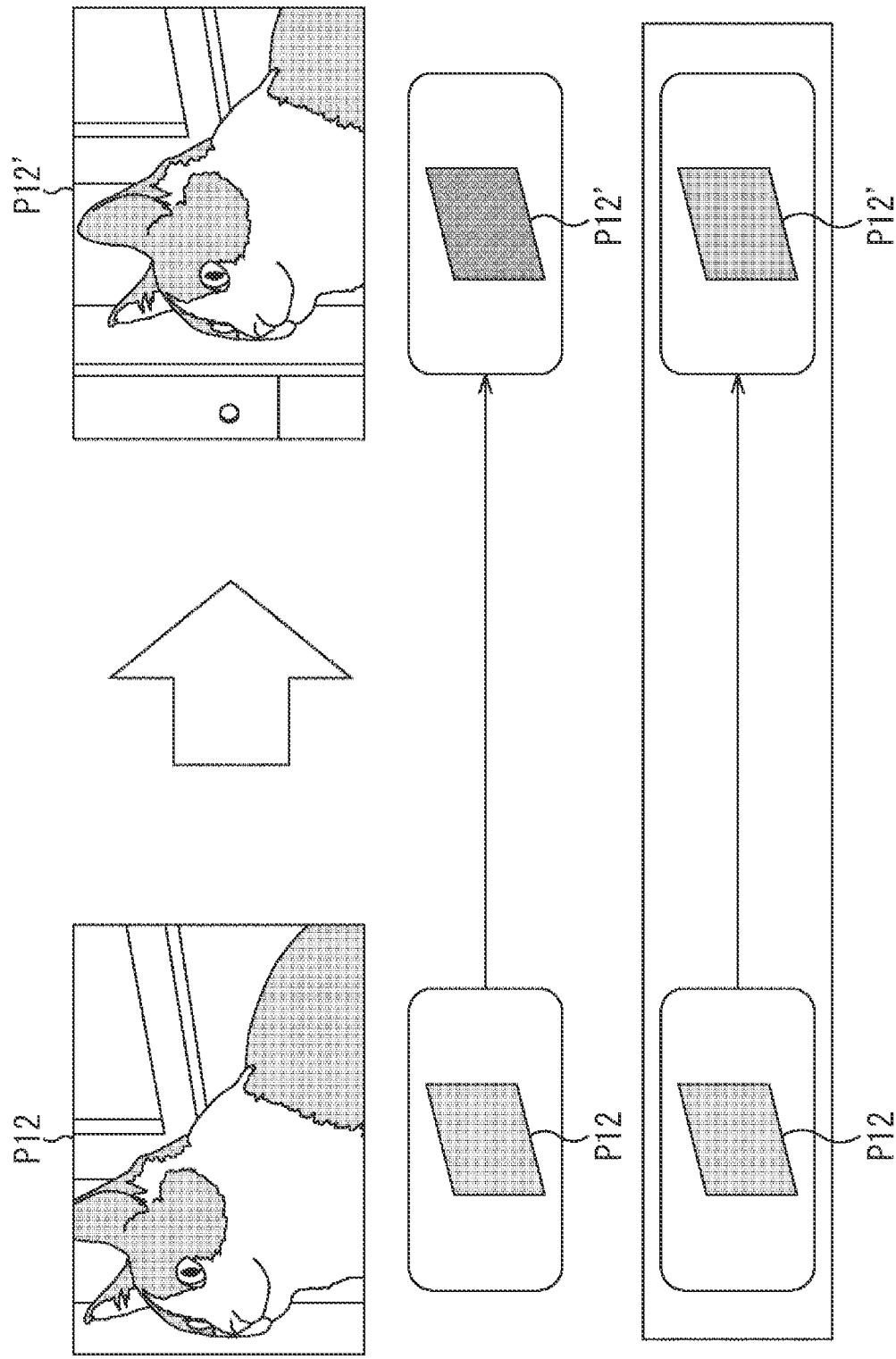
FIG. 3 is a diagram illustrating a case in which the AWB is to be temporarily fixed (No. 2).

Preferred embodiments of the present disclosure will be described below in detail with reference to the accompanying drawings. Note that, in the present specification and drawings, components having substantially the same functional configurations are denoted by the same reference numerals, and the description thereof will thus not be repeated.

Furthermore, the description will be given in the following order.

1. Outline of the present disclosure
2. First Embodiment
3. Second Embodiment
4. Example of execution by software 1. Outline of the Present Disclosure <White Balance Adjustment Function>

The present disclosure makes it possible to set an operation related to an auto white balance (AWB) lock in accordance with an operation member and an operation content for the operation member.

In describing an outline of an imaging device of the present disclosure, first, a white balance adjustment function will be described.

The white balance adjustment function is a function for correcting a color tone (color temperature) mounted on an imaging device such as a camera.

More specifically, the white balance adjustment function corrects the color tone so that white that changes under different light sources set in advance such as sunlight, an incandescent lamp, a fluorescent lamp, and a flash can be captured in an appropriate white color.

The white balance adjustment function includes preset white balance that corrects a preset light source, auto white balance that adjusts whiteness in accordance with a state of an entire image to be captured, and other functions such as manual white balance manually set by a user.

For example, in a case where a scene in which a racehorse is running is imaged at a racetrack as illustrated in an image P1 in FIG. 1, the light source during imaging is sunlight and is almost constant, and it is therefore appropriate to use preset white balance that uses sunlight as the light source.

Furthermore, for example, in a case where a scene in which a cat is sitting indoors is imaged as illustrated in an image P2 in FIG. 1, the light source during imaging is almost constant due to being indoors, and the color temperature of the cat as a subject can be specified to some extent, and it is therefore appropriate to use preset white balance that uses a color temperature set by a user.

On the other hand, as illustrated in an image P3 in FIG. 1, in a case where a wedding scene in a church or the like is imaged, due to influences of sunlight coming into a room through windows W1 to W3 in the background, shadows formed in the room, and the like, the color temperature changes in a variety of ways depending on the direction of imaging and the way light enters from the windows W1 to W3.

In such a case, since the light source is not fixed, it is appropriate to use auto white balance in accordance with the situation of the entire image, rather than switching the preset white balance or the like in accordance with the change of the light source in accordance with the situation.

The imaging device of the present disclosure appropriately implements a white balance adjustment function by auto white balance as desired by a user. Hereinafter, the white balance adjustment function by auto white balance is also simply referred to as an auto white balance (AWB).

<Case in which AWB is to be Temporarily Fixed (No. 1)>

As illustrated in an image P13 in FIG. 2, the AWB changes in accordance with the state of the entire image to be captured, and therefore changes frequently due to changes in light in an imaging environment and changes in light in accordance with changes in composition.

The image P13 in FIG. 2 is an image of the wedding scene in the church or the like corresponding to the image P3 in FIG. 1, and the color temperature changes frequently due to changes in composition made by a user, who is using an imaging device, moving in the church, changes in sunlight incident from the windows W1 to W3, or the like.

That is, as illustrated in the lower part of the image P13, the color temperature of images Pt1 to Ptn captured in chronological order changes frequently.

Note that, in the lower part of the image P13 in FIG. 2, the color temperature when the image P13 is captured is expressed by a color density of the images Pt1 to Ptn. In the lower part of the image P13 in FIG. 2, the state in which the color temperature of the images Pt1 to Ptn changes in chronological order is expressed.

In this case, even though the same scene has been imaged in chronological order, the color temperature of the images Pt1 to Ptn captured in chronological order is not constant, and this results in changes in color tone.

In this way, in a case where the same scene is imaged in chronological order, there are cases in which it is desirable to temporarily fix the color temperature regardless of changes in angle of view or light by locking the AWB at a timing when an image with a color temperature desired by a user is captured as illustrated in images Pt101 to Ptm below an image P13' in FIG. 2.

<Case in which AWB is to be Temporarily Fixed (No. 2)>

Furthermore, an image P12 in FIG. 3 is an image of the scene in which the cat is sitting indoors corresponding to the image P2 in FIG. 1, and it is assumed that an image P12' is captured by a user, who is using an imaging device, changing the angle (composition) with a focus locked at the cat as the subject.

When the image P12' is captured with the angle (composition) changed while the focus is locked at the cat as the subject as illustrated in the image P12 in FIG. 3, the AWB function causes the color temperature of the images P12 and P12' to change as illustrated in the middle part of FIG. 3.

In this way, there are cases in which it is desired to make an adjustment only to the composition in a state in which the focus is locked in a scene that a user wants to image, the AWB is also locked so that the color temperature of the images P12 and P12' is fixed as illustrated in the lower part of FIG. 3.

<Case in which AWB is to be Temporarily Fixed (No. 3)>

Figure 4:
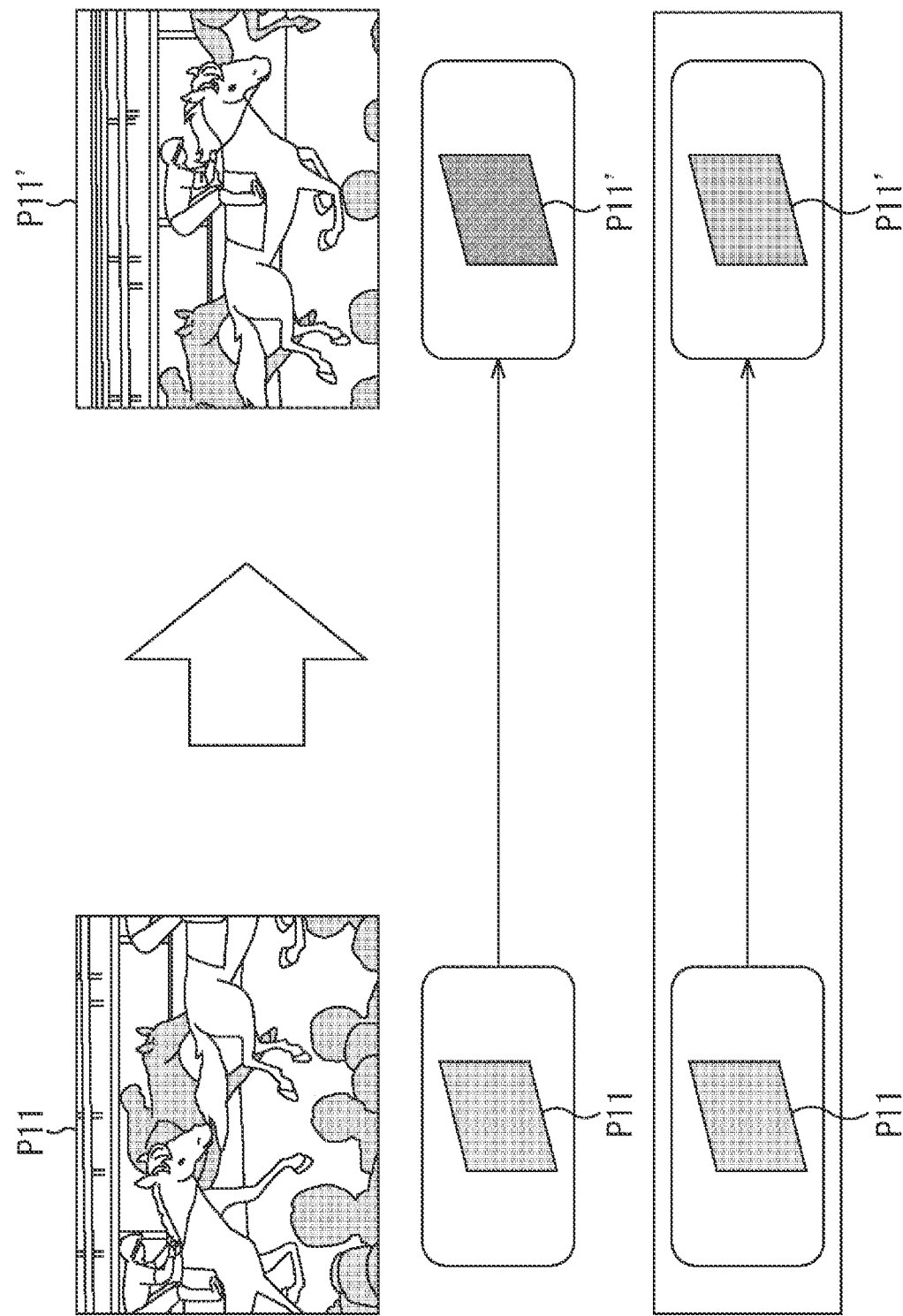
FIG. 4 is a diagram illustrating a case in which the AWB is to be temporarily fixed (No. 3).

Moreover, an image P11 in FIG. 4 is an image of the scene in which the racehorse is running at the racetrack corresponding to the image P1 in FIG. 1, and it is assumed that an image P11' is captured by a user, who is using an imaging device, performing continuous shooting while changing the angle in accordance with the movement of the racehorse as a subject.

When the image P11' is captured by continuous shooting while changing the angle following the running state of the racehorse as the subject as illustrated in the image P11 in FIG. 4, the AWB function causes the color temperature of the images P11 and P11' to change as illustrated in the middle part of FIG. 4.

That is, in such a case, the color tone in the continuously shot images changes. Thus, there are cases in which it is desired to lock the AWB after continuous shooting has started so that the same color temperature is maintained as illustrated in the lower part of FIG. 4.

In this way, there are a variety of scenes in which it is desired to fix the AWB, such as single shooting of newlyweds in the church in FIG. 2 imaged in chronological order, single shooting performed while the composition is changed with the focus locked in FIG. 3, and continuous shooting outdoors in FIG. 4.

The present disclosure makes it possible to set a variety of different situations in which an AWB lock can be applied in accordance with an operation member provided in an imaging device and an operation content for the operation member so that appropriate AWB locks for a variety of situations desired by a user can be implemented.

2. First Embodiment

Next, a configuration example of an imaging device of the present disclosure will be described.

Figure 5:
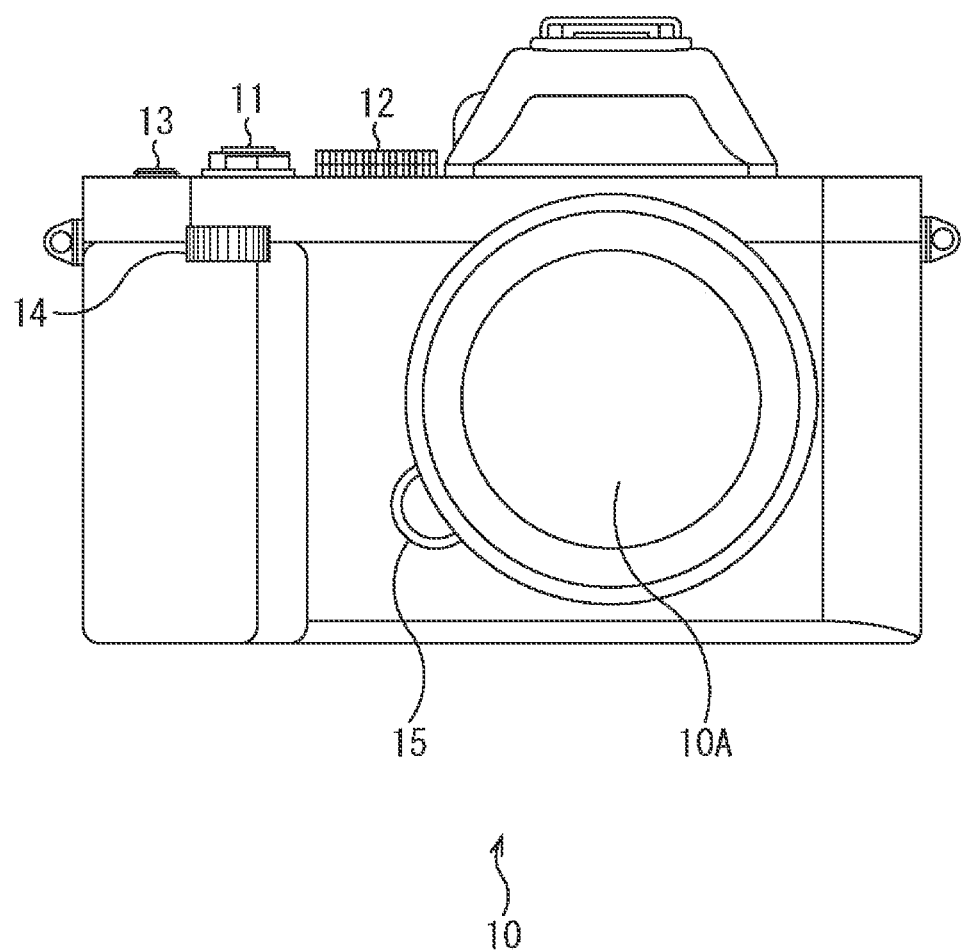
FIG. 5 is a front view illustrating an example of an external configuration of an image capturing device according to a first embodiment to which the present disclosure is applied.
Figure 6:
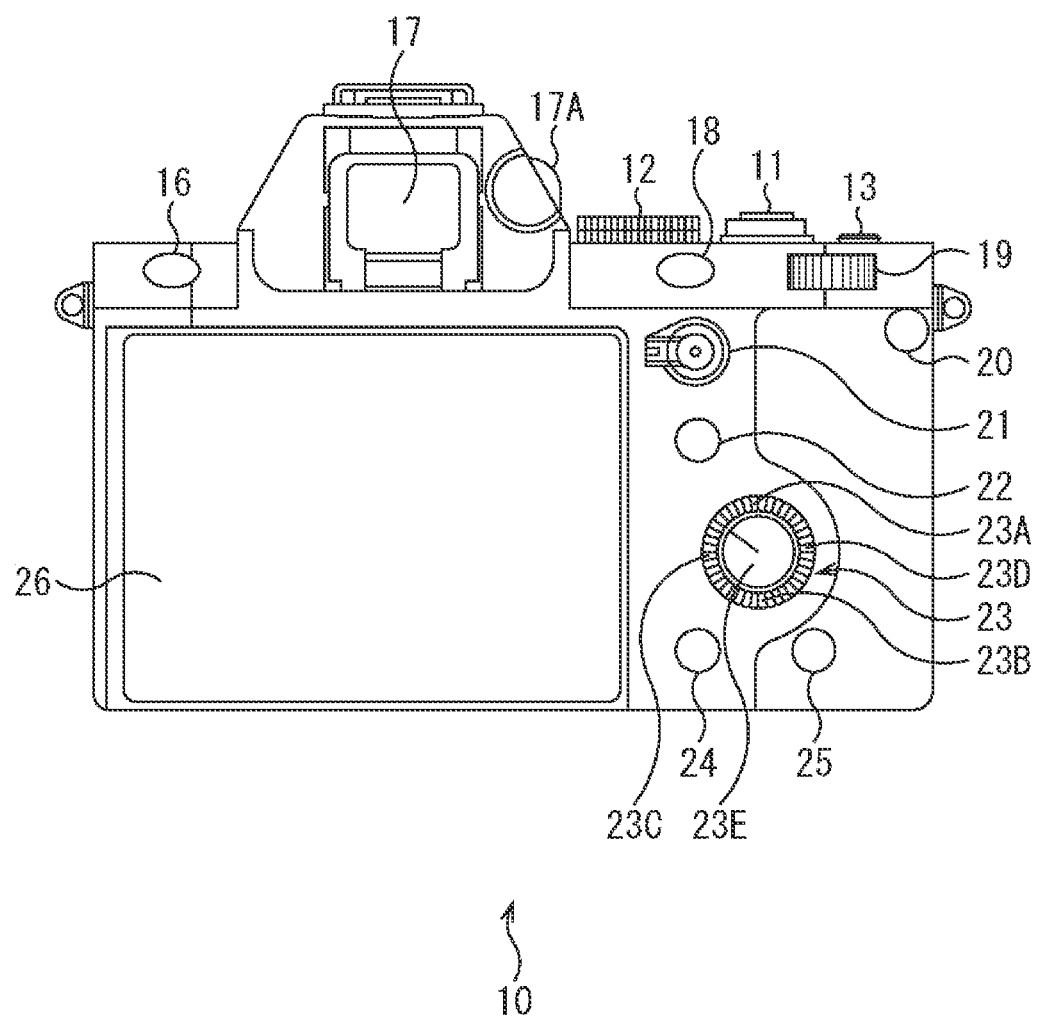
FIG. 6 is a back view illustrating the example of the external configuration of the image capturing device in FIG. 5.
Figure 7:
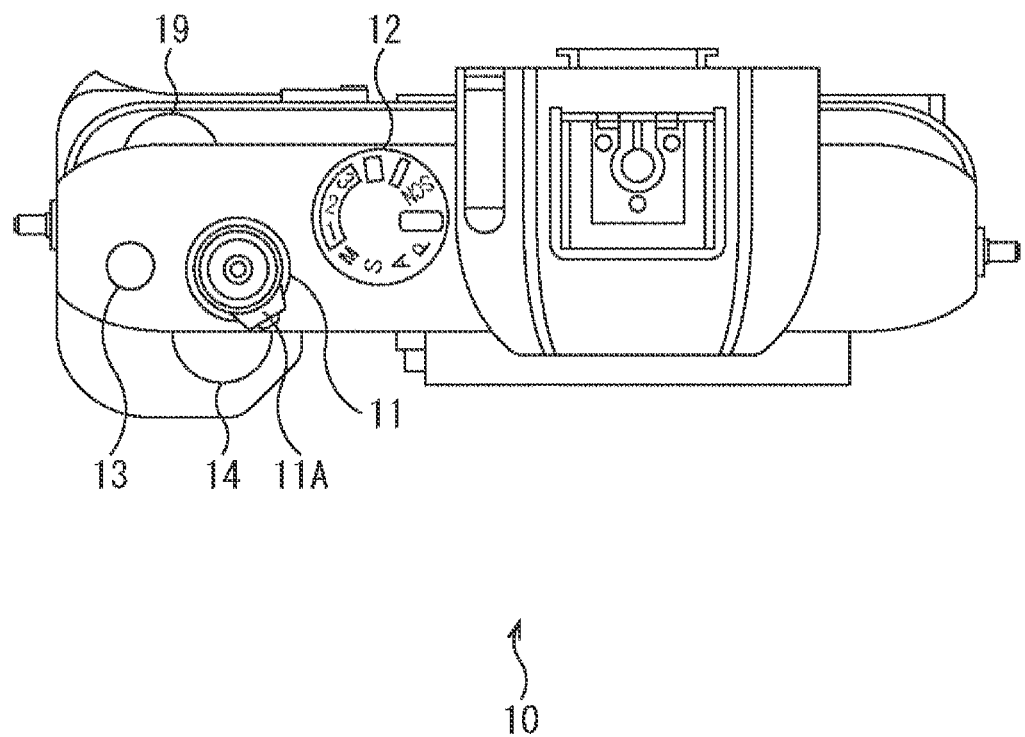
FIG. 7 is a top view illustrating the example of the external configuration of the image capturing device in FIG. 5.

FIGS. 5 to 7 are diagrams illustrating an example of an external configuration according to a first embodiment of an imaging device to which the present disclosure is applied. FIG. 5 is a front view of the imaging device, FIG. 6 is a back view of the imaging device, and FIG. 7 is a top view of the imaging device.

Note that, in the present specification, a surface on which a lens of the imaging device is arranged is referred to as a front surface, and a surface opposed to the front surface is referred to as a back surface. Furthermore, a direction perpendicular to the front surface and the back surface is referred to as a depth direction.

As illustrated in FIG. 5, on the front surface of an imaging device 10, a lens 10A is arranged in the center on the right side as viewed from a subject. The lens 10A collects light from the subject.

Furthermore, as illustrated in FIGS. 5 to 7, on a top surface of the imaging device 10, a shutter button 11 is arranged on the left side as viewed from the subject. The shutter button 11 is full-pressed when an image is to be captured.

Furthermore, the shutter button (release button) 11 is half-pressed when a given region in an image (e.g., a region in the center of the image or a region of a subject whose position in the depth direction is closest to the imaging device 10) is to be brought into focus (in focus).

Moreover, as illustrated in FIG. 7, the shutter button 11 is additionally provided with a power button 11A. The power button 11A is operated when the power of the imaging device 10 is to be turned on.

As illustrated in FIGS. 5 to 7, on the top surface of the imaging device 10, a mode dial 12 is arranged on the right side of the shutter button 11 and a custom button 13 is arranged on the left side as viewed from the subject. The mode dial 12 is operated when imaging mode is to be selected. The custom button 13 is a button to which a user can assign a desired function.

As illustrated in FIGS. 5 and 7, on the front surface of the imaging device 10, a front dial 14 is arranged on the upper left side of the lens 10A as viewed from the subject. The front dial 14 is operated, for example, when a shutter speed is to be adjusted.

As illustrated in FIG. 5, on the front surface of the imaging device 10, a lens lock button 15 is arranged adjacent to the lens 10A. The lens lock button 15 is operated when the lens 10A is removed from the imaging device 10.

As illustrated in FIG. 6, on the back surface of the imaging device 10, a menu button 16 is arranged on the upper left side when facing the subject. The menu button 16 is pressed when a menu screen is to be displayed.

Furthermore, as illustrated in FIG. 6, a finder 17 is arranged on the upper right side of the menu button 16 on the back surface of the imaging device 10 when facing the subject, and a diopter adjustment dial 17A is arranged on the right side of the finder 17 when facing the subject. The finder 17 is a liquid crystal panel for checking the subject at the time of imaging.

The diopter adjustment dial 17A is operated when the power of the finder 17 is to be adjusted. A user operates the diopter adjustment dial 17A so that an image displayed on the finder 17 becomes clearer. As a result, an image suitable for the user's visual acuity is displayed on the finder 17.

As illustrated in FIGS. 6 and 7, a custom button 18 is arranged on the lower right side of the finder 17 on the back surface of the imaging device 10 when facing the subject, and a rear dial 19 is arranged on the right side of the custom button 18 when facing the subject.

In a similar manner to the custom button 13, the custom button 18 is a button to which a user can assign a desired function. The rear dial 19 is operated, for example, when an aperture value is to be adjusted.

As illustrated in FIG. 6, a record button 20 is arranged on the lower right side of the rear dial 19 on the back surface of the imaging device 10 when facing the subject. The record button 20 is pressed when a moving image is to be captured.

Furthermore, as illustrated in FIG. 6, an AEL button 21 is arranged below the custom button 18 on the back surface of the imaging device 10, and a Fn button 22 is arranged below the AEL button 21.

The AEL button 21 is pressed, for example, when an exposure of the entire screen is to be fixed. The Fn button 22 is pressed when a setting screen for setting various imaging functions is to be displayed.

As illustrated in FIG. 6, a cross key 23 is arranged under the Fn button 22 on the back surface of the imaging device 10. The cross key 23 is constituted by an upper button 23A, a lower button 23B, a left button 23C, a right button 23D, and a center button 23E.

The buttons 23A to 23D of the cross key 23 are pressed when a cursor or the like on the menu screen or the setting screen displayed on the liquid crystal monitor 26 is to be moved up, down, left, and right, respectively.

The center button 23E is pressed, for example, when an instruction to make a determination on the menu screen or the setting screen displayed on the liquid crystal monitor 26 is given.

As illustrated in FIG. 6, a play button 24 is arranged on the lower left side and a delete button 25 is arranged on the lower right side of the cross key 23 on the back surface of the imaging device 10 when facing the subject.

The play button 24 is pressed when a captured image is to be reproduced. The delete button 25 is pressed when a captured image displayed on the liquid crystal monitor 26 is to be deleted.

As illustrated in FIG. 6, on the back surface of the imaging device 10, the liquid crystal monitor 26 is arranged on the left side when facing the subject. The menu screen, the setting screen, a captured image, and the like are displayed on the liquid crystal monitor 26.

<Hardware Configuration Example of Imaging Device>

Figure 8:
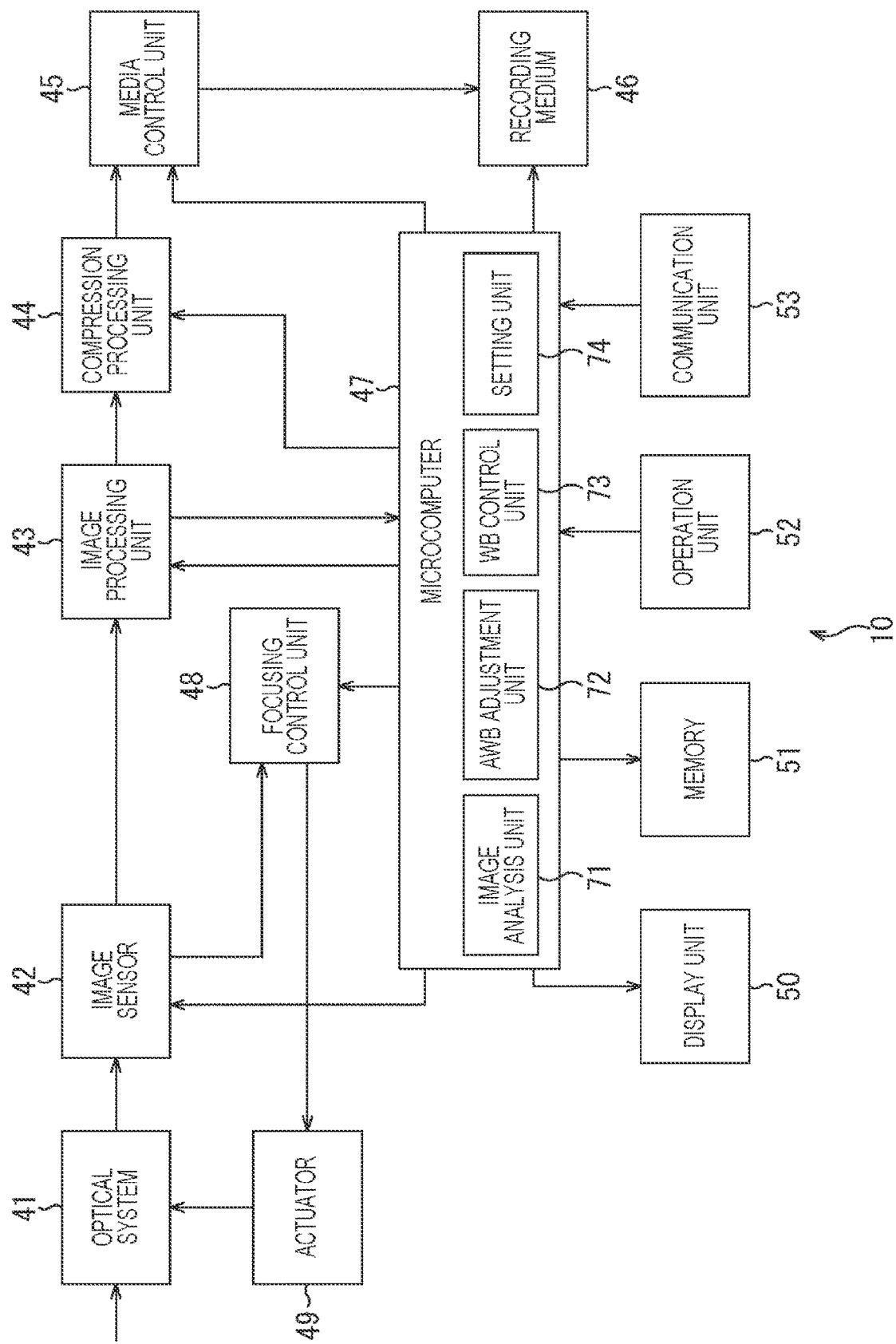
FIG. 8 is a block diagram illustrating a hardware configuration example of the image capturing device in FIG. 5.

FIG. 8 is a block diagram illustrating a hardware configuration example of the imaging device 10.

The imaging device 10 in FIG. 8 includes an optical system 41, an image sensor 42, an image processing unit 43, a compression processing unit 44, a media control unit 45, a recording medium 46, a focusing control unit 48, and a microcomputer 47. Furthermore, the imaging device 10 includes the focusing control unit 48, an actuator 49, a display unit 50, a memory 51, an operation unit 52, and a communication unit 53.

Specifically, the optical system 41 and the image sensor 42 function as an acquisition unit to acquire an image. More specifically, the optical system 41 is constituted by the lens 10A, a diaphragm (not illustrated), and the like. The optical system 41 collects light from the subject on the image sensor 42. The optical system 41 is driven by the actuator 49.

The image sensor 42 photoelectrically converts light collected by the lens 10A on a pixel-by-pixel basis to acquire an electric signal that is an analog signal of each pixel of the image. Furthermore, the image sensor 42 acquires phase difference information indicating the amount of deviation from a focal plane of an image in a detection unit constituted by one or more pixels on the basis of the light collected by the optical system 41. The image sensor 42 supplies the electric signal of each pixel to the image processing unit 43, and supplies the phase difference information to the focusing control unit 48.

The image processing unit 43 performs image processing such as an analog-to-digital conversion on the electric signal of each pixel of the image supplied from the image sensor 42. The image processing unit 43 supplies, as image data, digital data of each pixel of the image obtained as a result of the image processing to the compression processing unit 44 and the microcomputer 47.

The compression processing unit 44 compresses the image data supplied from the image processing unit 43, as needed. The compression processing unit 44 supplies the compressed image data to the media control unit 45.

The media control unit 45 controls the recording medium 46, and causes the recording medium 46 to record the compressed image data supplied from the compression processing unit 44. The processing of acquiring and compressing an image by the image sensor 42 and recording the compressed image data in this way is called imaging. The recording medium 46 records the compressed image data under the control of the media control unit 45.

The microcomputer 47 controls each unit of the imaging device 10. For example, the microcomputer 47 causes the liquid crystal monitor 26 of the display unit 50 to display the menu screen or the setting screen on the basis of an operation signal, or causes the display unit 50 to display an image on the basis of image data from the image processing unit 43.

Furthermore, the microcomputer 47 analyzes the image data from the image processing unit 43, adjusts the white balance, causes the image in which the white balance has been adjusted to be displayed on the display unit 50, and outputs the image to the image processing unit 43. Thus, the image processing unit 43 outputs, to the compression processing unit 44, the image data of the image in which the white balance has been adjusted by the microcomputer 47.

Furthermore, the microcomputer 47 includes an image analysis unit 71, an AWB adjustment unit 72, a WB control unit 73, and a setting unit 74.

The image analysis unit 71 analyzes an image on the basis of image data supplied from the image processing unit 43, estimates a light source color from digital data for each of R, G, and B, and outputs a result of the estimation to the AWB adjustment unit 72.

The AWB adjustment unit 72 obtains the amount of white balance adjustment on the basis of the light source color estimated by the image analysis unit 71, generates image data in which the entire image has been adjusted, and outputs the image data to the image processing unit 43 or displays the image data on the display unit 50.

In response to an operation on the operation unit 52, the WB control unit 73 obtains the amount of white balance adjustment on the basis of a light source color designated in advance among preset light sources, generates image data in which the entire image has been adjusted, and outputs the image data to the image processing unit 43 or displays the image data on the display unit 50.

The setting unit 74 stores an operation mode setting for WB such as preset white balance or AWB, an operation to be performed when an AWB lock is applied in an AWB operation mode, a display of a custom button setting screen on the liquid crystal monitor 26, and setting information regarding a setting screen determined by an operation on the operation unit 52.

The focusing control unit 48 controls the actuator 49 so that a focusing region is brought into focus on the basis of the focusing region supplied from the microcomputer 47 and phase difference information supplied from the image sensor 42.

The actuator 49 is controlled by the focusing control unit 48 or the like. The actuator 49 drives the optical system 41, and controls a focus position, the aperture value, and a zoom magnification.

The display unit 50 is constituted by the finder 17 and the liquid crystal monitor 26 in FIG. 6. On the basis of image data of a captured image (image to be compressed and recorded), the display unit 50 displays the captured image under the control of the microcomputer 47. Furthermore, under the control of the microcomputer 47, the display unit 50 displays, as a live view image, an image based on image data of an image that is not a captured image (an image not to be compressed and recorded). The liquid crystal monitor 26 of the display unit 50 displays the menu screen or the setting screen under the control of the microcomputer 47.

The memory 51 is a workspace of the microcomputer 47. The memory 51 stores intermediate results and final results of processing by the microcomputer 47. For example, the memory 51 stores a face detection mode supplied from the microcomputer 47.

The operation unit 52 supplies the microcomputer 47 with operation signals indicating operations on the shutter button 11, the power button 11A, the mode dial 12, the custom button 13, the front dial 14, the menu button 16, the diopter adjustment dial 17A, and the custom button 18. Furthermore, the operation unit 52 supplies the microcomputer 47 with operation signals indicating operations on the rear dial 19, the record button 20, the AEL button 21, the Fn button 22, the cross key 23, the play button 24, and the delete button 25.

The communication unit 53 is controlled by the microcomputer 47, and is constituted by a local area network (LAN) adapter, Bluetooth (registered trademark), or the like, and performs wired or wireless communication with an external device via a network represented by the Internet or short-range communication.

<Types of AWB Locks>

The imaging mode includes a still image mode for capturing a still image and a moving image mode for capturing a moving image. AWB locks implemented in the present disclosure include an operation related to both the moving image mode and the still image mode (AWB lock by a custom button) and an operation related to only the still image mode (shutter AWB lock).

AWB locks in a case where an operating state of the AWB has been set to on are roughly classified into two types of AWB locks: an AWB lock by an operation on the shutter button 11 related to only the still image mode, and an AWB lock by an operation on the custom button 13 or 18 related to both the moving image mode and the still image mode.

Furthermore, the AWB lock by an operation on the shutter button 11 is classified into as follows: an AWB lock when the shutter button 11 is half-pressed and an AWB lock when the shutter button 11 continues to be full-pressed so that continuous shooting is enabled (continuous shooting operation).

Figure 9:
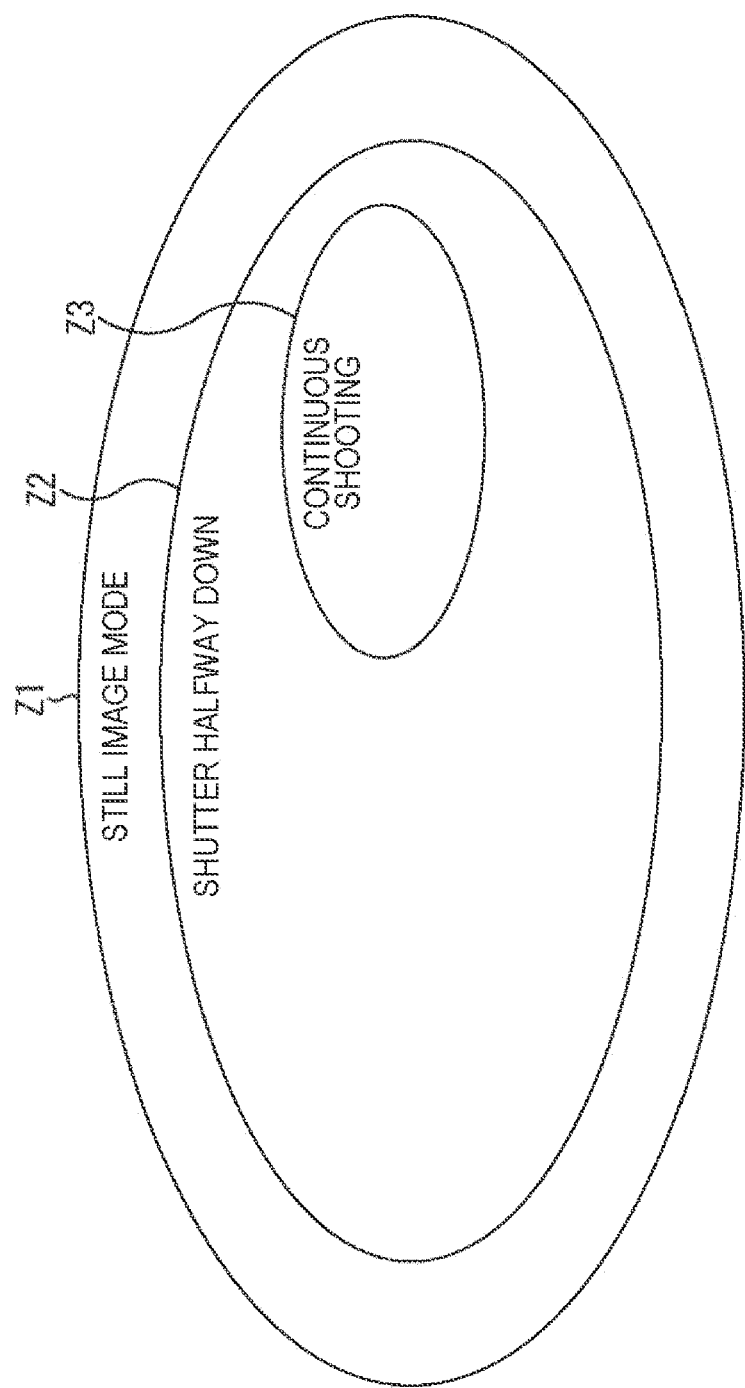
FIG. 9 is a diagram illustrating types of AWB locks.

Of these, the AWB lock when the shutter button 11 is half-pressed is enabled by all half-press operations regardless of continuous shooting or single shooting among the entire operation on the shutter button 11 in the still image mode expressed by a region Z1 as illustrated in FIG. 9, and is therefore an operation expressed as a range Z2, which is a part of the region Z1.

With such a setting, a user can apply an AWB lock by half-pressing the shutter button 11 at a timing when the user recognizes that a desired color temperature is obtained while viewing a live view image, and can adjust, in this situation, the composition until a desired composition is obtained.

Moreover, the AWB lock when the shutter button 11 continues to be full-pressed so that continuous shooting is enabled (continuous shooting operation) is an AWB lock that is operated by a half-press operation and then a continuous full-press operation that results in continuous shooting being enabled, and is therefore expressed as a range Z3, which is a part of the range Z2 in FIG. 9. That is, AWB locks by a half-press operation include an AWB lock in a continuous shooting state.

With such a setting, a user can apply an AWB lock after continuous shooting has been enabled by a continuous full-press operation on the shutter button 11. The AWB lock can be continuously applied until the continuous shooting state ends, and this makes it possible to unify the color temperatures of images captured in the continuous shooting state.

Thus, in the imaging device 10 of the present disclosure, it is possible to selectively set an operation on the shutter button 11 for applying an AWB lock as desired by a user.

That is, it is possible to selectively set any one of three modes: a mode in which the AWB lock is applied when the shutter button 11 is half-pressed, a mode in which the AWB lock is applied when continuous shooting is enabled by a continuous full-press operation on the shutter button 11, and a mode in which the AWB lock cannot be applied regardless of the operation on the shutter button 11.

Furthermore, in a case where a function as a button for locking the AWB (hereinafter, also referred to as an auto white balance lock (AWBL) button) has been assigned to the custom button 13 or 18, the AWB lock is applied by an operation on the custom button 13 or 18.

Moreover, in a case where a function as an AWBL button has been assigned to the custom button 13 or 18, the AWB lock can be applied by two types of operations: a hold operation and a toggle operation.

The hold operation is an operation in which the AWB lock is applied while the custom button 13 or 18 to which the function as an AWBL button has been assigned is pressed, and the AWB is enabled while the custom button 13 or 18 is not pressed.

That is, in a case where the function as an AWBL button has been assigned to the custom button 13 or 18 and the hold operation has been set, the AWB lock is applied only while a user is pressing the custom button 13 or 18, and other than that, the AWB is enabled.

Furthermore, the toggle operation is an operation in which the AWB lock is applied after the custom button 13 or 18, to which the function as an AWBL button has been assigned, has been pressed for the first time and then released, and the AWB lock is released when the custom button 13 or 18 is pressed for the second time and then released.

That is, in a case where the function as an AWBL button has been assigned to the custom button 13 or 18 and the toggle operation has been set, the AWB lock is applied during a period from when a user presses and then releases the custom button 13 or 18 for the first time until when the user presses and then releases the custom button 13 or 18 for the second time, and other than that, the AWB is enabled.

Furthermore, the custom buttons 13 and 18 accept an operation for applying the AWB lock only in a case where the function as an AWBL button has been assigned, and when the function as an AWBL button is assigned, either the hold operation or the toggle operation can be selectively set.

Moreover, as for the custom buttons 13 and 18, the function as an AWBL button can be assigned to only one of them, or the function as an AWBL button can be assigned to both of them. In a case where the function as an AWBL button is assigned to both of the custom buttons 13 and 18, it is possible to set both of them to the hold operation or to the toggle operation. Alternatively, one of them may be set to the hold operation and the other may be set to the toggle operation.

Note that, the custom buttons 13 and 18 accept an operation for applying the AWB lock only in a case where the function as an AWBL button has been assigned, and it is therefore possible to configure a setting in which the function as an AWBL button is not assigned, so that the custom buttons 13 and 18 do not function as AWBL buttons.

Furthermore, when the function as an AWBL button has been assigned to the custom button 13 or 18, it is possible to apply an AWB lock independently of an operation on the shutter button 11.

As a result, for example, even in a case where a setting has been configured in which the focus lock by autofocus and the exposure lock by autoexposure are applied by a half-press operation on the shutter button 11, the AWB lock can be operated independently.

That is, for example, even in a situation in which the focus lock and the exposure lock are applied at the same time, it is possible to switch only the AWB lock on or off by operating the custom button 13 or 18.

Furthermore, hereinafter, the AWB lock by an operation on the shutter button 11 described above is also referred to as a shutter AWB lock, and the AWB lock by an operation on the custom button 13 or 18 is also referred to as a custom button AWB lock.

<Shutter AWB Lock Setting Processing>

Figure 10:
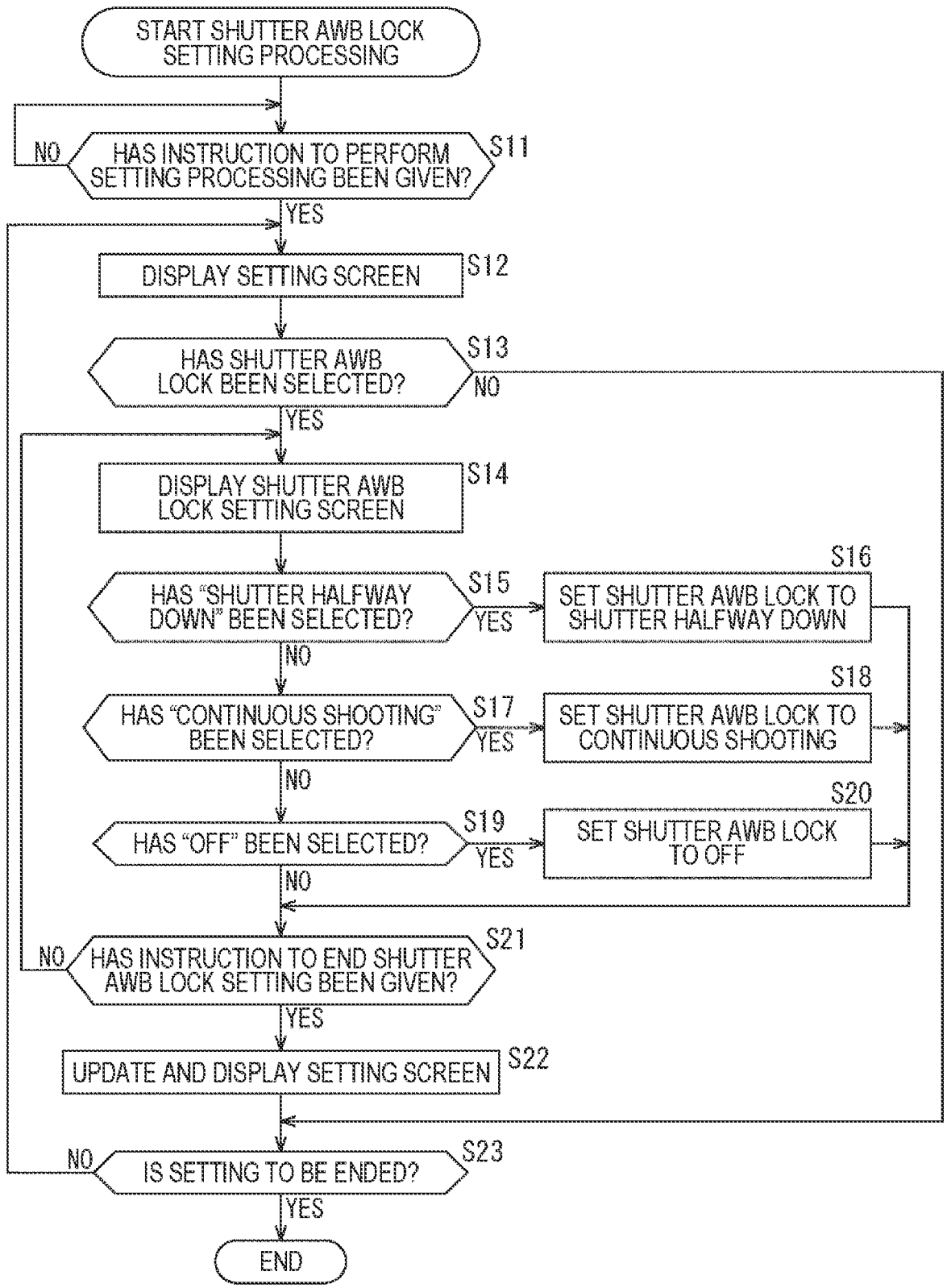
FIG. 10 is a flowchart illustrating shutter AWB lock setting processing.

Next, shutter AWB lock setting processing will be described with reference to a flowchart in FIG. 10.

In step S11, the setting unit 74 of the microcomputer 47 controls the operation unit 52 to determine whether or not an instruction to perform the setting processing has been given. Similar processing is repeated until an instruction to perform the setting processing is given.

If it is determined in step S11 that an instruction to perform the setting processing has been given, the processing proceeds to step S12.

Figure 11:
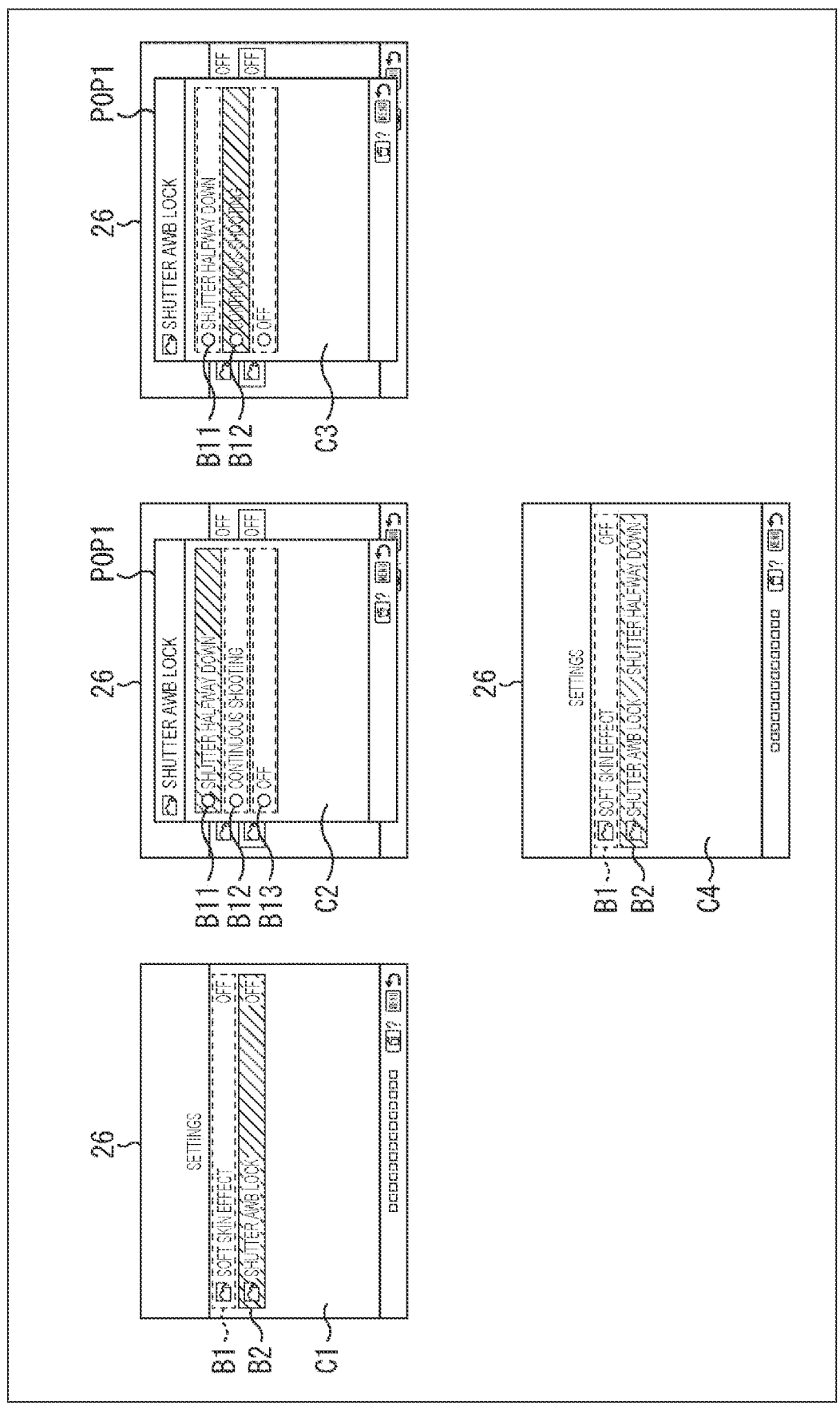
FIG. 11 is a diagram illustrating a setting screen related to the shutter AWB lock setting processing.

In step S12, the setting unit 74 displays, for example, a setting screen C1 illustrated in the upper left part of FIG. 11 on the liquid crystal monitor 26 of the display unit 50.

In the setting screen C1 in FIG. 11, "Settings" is displayed at the top, indicating that a setting screen is displayed.

Furthermore, under "Settings", "Soft Skin Effect" and "Shutter AWB Lock" are displayed in this order from the top, and respectively have selection fields B1 and B2 displayed with "Off" displayed on the right side. This indicates a state in which both "Soft Skin Effect" and "Shutter AWB Lock" have been set to Off.

Moreover, the selection fields B1 and B2 can be selected as setting targets. In FIG. 11, the selection field B2 is highlighted. This indicates that the selection field B2 has been selected as a setting target.

In step S13, the setting unit 74 controls the operation unit 52 to determine whether or not the cross key 23 or the like has been operated to select "Shutter AWB Lock" as a setting target.

Note that, in FIG. 11, both "Soft Skin Effect" and "Shutter AWB Lock" can be selected as setting targets, but here, for convenience of description, only processing in which only "Shutter AWB Lock" has been selected will be described.

In step S13, for example, as illustrated in the setting screen C1 in FIG. 11, in a case where the cross key 23 or the like has been operated, the selection field B2 has been selected as a setting target, and then a determination operation has been performed, it is regarded that "Shutter AWB Lock" has been selected as a setting target, and the processing proceeds to step S14.

In step S14, the setting unit 74 displays, for example, a setting screen C2 illustrated in the center of the upper part of FIG. 11 on the liquid crystal monitor 26 of the display unit 50.

In the setting screen C2 in FIG. 11, a pop-up POP1 is displayed on the display of the setting screen C1. "Shutter AWB Lock" is displayed at the top of the pop-up POP1, indicating that the pop-up POP1 is a setting screen for "Shutter AWB Lock".

Furthermore, under "Shutter AWB Lock" in the pop-up POP1, selection fields B11 to B13 are displayed in this order from the top, and "Shutter Halfway Down", "Continuous Shooting", and "Off" are displayed in the selection fields B11 to B13, respectively.

All of the selection fields B11 to B13 can be selected by operating the cross key 23 or the like.

That is, "Shutter Halfway Down" is displayed in the selection field B11, and is a setting selected so that "Shutter AWB Lock" is operated when the shutter button 11 is half-pressed.

Furthermore, "Continuous Shooting" is displayed in the selection field B12, and is a setting selected so that "Shutter AWB Lock" is operated when the shutter button 11 has been continuously full-pressed and a continuous shooting state has started.

Moreover, "Off" is displayed in the selection field B13, and is a setting selected not to allow "Shutter AWB Lock" to be operated by the shutter button 11, that is, selected to turn off "Shutter AWB Lock".

In FIG. 11, the selection field B11 is highlighted, which indicates that "Shutter Halfway Down" of the selection field B11 is selected.

In step S15, the setting unit 74 controls the operation unit 52 to determine whether or not the cross key 23 or the like has been operated so that an instruction is given to configure a setting in which "Shutter AWB Lock" is operated when a "Shutter Halfway Down" operation is performed.

In step S15, for example, if the selection field B11 has been highlighted as illustrated in FIG. 11, "Shutter Halfway Down" in the selection field B11 has been selected, and a determination operation has been performed, it is regarded that an instruction has been given to configure a setting in which "Shutter AWB Lock" is operated when a "Shutter Halfway Down" operation is performed, and the processing proceeds to step S16.

In step S16, the setting unit 74 sets "Shutter AWB Lock" to a mode in which "Shutter AWB Lock" is operated when "Shutter Halfway Down" operation is performed, and stores the setting information.

Furthermore, if, in step S15, an instruction has not been given to configure a setting in which "Shutter AWB Lock" is operated when a "Shutter Halfway Down" operation is performed, the processing proceeds to step S17.

In step S17, the setting unit 74 controls the operation unit 52 to determine whether or not the cross key 23 or the like has been operated to give an instruction to configure a setting in which "Shutter AWB Lock" is operated when a full-press operation has been continuously performed and "Continuous Shooting" has started.

In step S17, for example, if the selection field B12 has been highlighted as illustrated in a setting screen C3 in the upper right part of FIG. 11, "Continuous Shooting" in the selection field B12 has been selected, and a determination operation has been performed, it is regarded that an instruction has been given to configure a setting in which "Shutter AWB Lock" is operated when a full-press operation has been continuously performed and "Continuous Shooting" has started, and the processing proceeds to step S18.

In step S18, the setting unit 74 sets "Shutter AWB Lock" to a mode in which "Shutter AWB Lock" is operated when a full-press operation has been continuously performed and "Continuous Shooting" has started, and stores the setting information.

Furthermore, if an instruction to configure a setting in which "Shutter AWB Lock" is operated during "Continuous Shooting" has not been given in step S17, the processing proceeds to step S19.

In step S19, the setting unit 74 controls the operation unit 52 to determine whether or not the cross key 23 or the like has been operated to give an instruction to set "Shutter AWB Lock" to Off.

In step S19, for example, if "Off" in the selection field B13 in FIG. 11 has been selected and a determination operation has been performed, it is regarded that an instruction has been given to configure a setting in which "Shutter AWB Lock" is set to Off and is not operated by the shutter button 11, and the processing proceeds to step S20.

In step S20, the setting unit 74 sets "Shutter AWB Lock" to an operation mode in which "Shutter AWB Lock" is turned "Off" and cannot be operated by the shutter button 11, and stores the setting information.

Furthermore, in step S19, if "Off" has not been selected as "Shutter AWB Lock", the processing proceeds to step S21.

In step S21, the setting unit 74 controls the operation unit 52 to determine whether or not, for example, the cross key 23 has been operated to give an instruction to end the shutter AWB lock setting.

If an instruction to end the shutter AWB lock setting has not been given in step S21, the processing returns to step S14. That is, in step S21, the processing of steps S14 to S21 is repeated until an instruction to end the shutter AWB lock setting is given.

Then, if an instruction to end the shutter AWB lock setting has been given in step S21, the processing proceeds to step S22.

In step S22, the setting unit 74 updates the setting screen on the basis of the stored setting information, and displays the updated setting screen on the liquid crystal monitor 26 of the display unit 50. For example, the setting unit 74 displays a setting screen C4 illustrated in the center of the lower part of FIG. 11 on the liquid crystal monitor 26.

On the setting screen C4 in FIG. 11, "Shutter Halfway Down" is displayed on the right side of "Shutter AWB Lock". This indicates that "Shutter AWB Lock" has been set to a mode in which "Shutter AWB Lock" is operated when a "Shutter Halfway Down" operation is performed.

In step S23, the setting unit 74 controls the operation unit 52 to determine whether or not, for example, the cross key 23 has been operated to give an instruction to end the setting.

If an instruction to end the setting has not been given in step S23, the processing returns to step S12.

That is, the processing of steps S12 to S23 is repeated until an instruction to end the setting is given.

Then, in step S23, if an instruction to end the setting has been given, the processing ends.

Note that if "Shutter AWB Lock" is not selected as a setting target in step S13, the processing of steps S14 to S22 is skipped.

As a result of the processing described above, the shutter AWB lock is set to one of the following operation modes: an operation mode in which the shutter AWB lock is enabled when the shutter button 11 is half-pressed, an operation mode in which the shutter AWB lock is enabled when continuous shooting is enabled by a continuous full-press operation, or an operation mode in which the AWB lock cannot be applied by the shutter button 11.

As a result, the AWB lock operation can be switched and set in accordance with the operation content for the shutter button 11.

Note that an example of setting an AWB lock operation mode for the shutter button 11 has been described above, but it is also possible to allow the autofocus and autoexposure settings to be configured in combination.

As an operation mode to be performed at the time of a half-press operation, it is possible to allow, for example, an operation mode for applying an AWB lock to which a condition for using the focus lock and the exposure lock in combination has been attached to be selected.

It may be possible to allow an operation mode to be selected from, for example, an operation mode for applying the focus lock, the exposure lock, and the AWB lock, an operation mode for not applying the focus lock but applying the exposure lock and the AWB lock, and an operation mode for not applying the exposure lock but applying the focus lock and the AWB lock.

<Custom Button Setting Processing>

Figure 12:
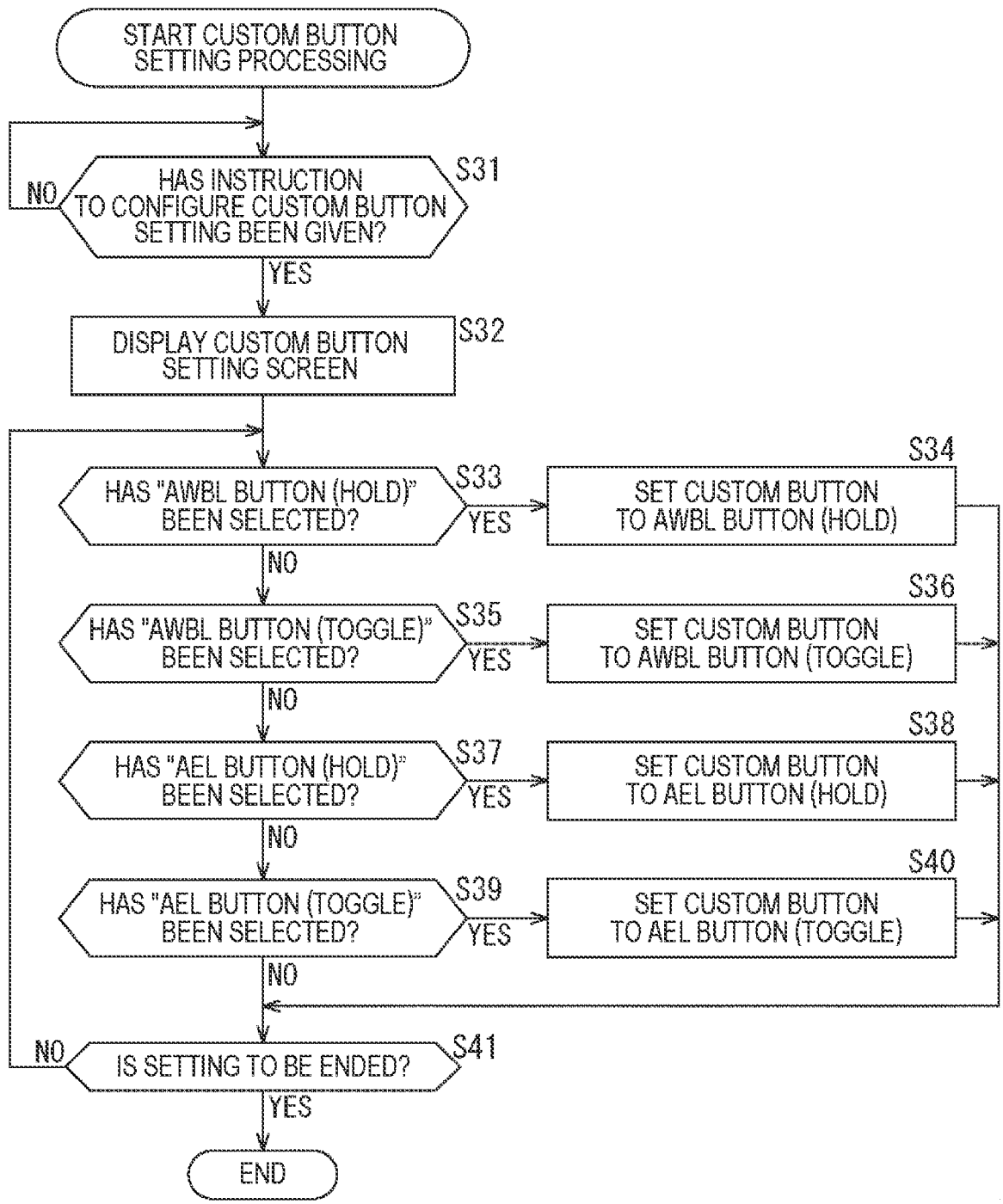
FIG. 12 is a flowchart illustrating custom button setting processing.

Next, custom button setting processing will be described with reference to a flowchart in FIG. 12.

In step S31, the setting unit 74 of the microcomputer 47 controls the operation unit 52 to determine whether or not an instruction to configure a custom button setting has been given.

If an instruction to configure the custom button setting has been given in step S31, the processing proceeds to step S32.

Figure 13:
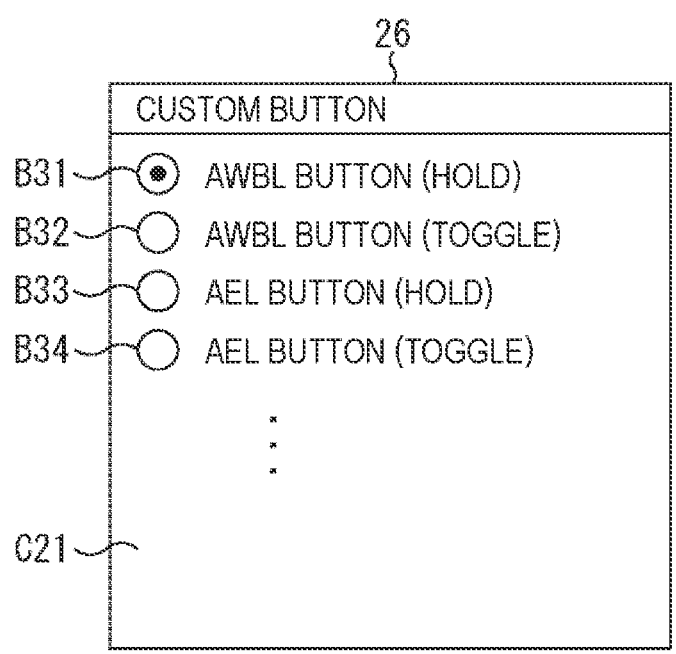
FIG. 13 is a diagram illustrating a setting screen related to the custom button setting processing.

In step S32, the setting unit 74 displays, for example, a setting screen C21 illustrated in FIG. 13 on the liquid crystal monitor 26 of the display unit 50.

In the setting screen C21 in FIG. 13, "Custom Button" is displayed at the top, indicating that the screen is the custom button setting screen.

Furthermore, under "Custom Button", selection fields B31 to B34 are displayed in this order from the top, and "AWBL Button (Hold)", "AWBL Button (Toggle)", "AEL Button (Hold)", and "AEL Button (Toggle)" are displayed in the selection fields B31 to B34, respectively.

Functions that can be assigned to the custom button 13 are displayed in the selection fields B31 to B34, and it is possible to select one of the selection fields B31 to B34 to assign the corresponding function.

Note that the "AEL button" functions displayed in the selection fields B33 and B34 are similar to the functions of the AEL button 21, and are respectively a setting in which the function is enabled when a hold operation is performed and a setting in which the function is enabled when a toggle operation is performed.

In FIG. 13, the selection field B31 is highlighted This indicates a state in which "AWBL button (Hold)" is selected to be assigned to the custom button 13 or 18.

In step S33, the setting unit 74 controls the operation unit 52 to determine whether or not the cross key 23 or the like has been operated to select "AWBL button (Hold)" as a function to be assigned to the custom button 13.

In step S33, for example, if the selection field B31 has been highlighted as illustrated in FIG. 13, "AWBL button (Hold)" in the selection field B31 has been selected, and a determination operation has been performed, it is regarded that "AWBL button (Hold)" has been selected as a function to be assigned to the custom button 13, and the processing proceeds to step S34.

In step S34, the setting unit 74 configures a setting so that the function of "AWBL button (Hold)" is assigned to the custom button 13, and stores the setting information.

In step S33, if "AWBL button (Hold)" has not been selected as a function to be assigned to the custom button 13, the processing proceeds to step S35.

In step S35, the setting unit 74 controls the operation unit 52 to determine whether or not the cross key 23 or the like has been operated to select "AWBL button (Toggle)" as a function to be assigned to the custom button 13.

In step S35, if "AWBL button (Toggle)" in the selection field B32 has been selected and a determination operation has been performed, it is regarded that "AWBL button (Toggle)" has been selected as a function to be assigned to the custom button 13, and the processing proceeds to step S36.

In step S36, the setting unit 74 configures a setting so that the function of "AWBL button (Toggle)" is assigned to the custom button 13, and stores the setting information.

In step S35, if "AWBL button (Toggle)" has not been selected as a function to be assigned to the custom button 13, the processing proceeds to step S37.

In step S37, the setting unit 74 controls the operation unit 52 to determine whether or not the cross key 23 or the like has been operated to select "AEL button (Hold)" as a function to be assigned to the custom button 13.

In step S37, for example, if "AEL button (Hold)" in the selection field B33 has been selected and a determination operation has been performed, it is regarded that "AEL button (Hold)" has been selected as a function to be assigned to the custom button 13, and the processing proceeds to step S38.

In step S38, the setting unit 74 configures a setting so that the function of "AEL button (Hold)" is assigned to the custom button 13, and stores the setting information.

In step S37, if "AEL button (Hold)" has not been selected as a function to be assigned to the custom button 13, the processing proceeds to step S39.

In step S39, the setting unit 74 controls the operation unit 52 to determine whether or not the cross key 23 or the like has been operated to select "AEL button (Toggle)" as a function to be assigned to the custom button 13.

In step S39, if "AEL button (Toggle)" in the selection field B34 has been selected and a determination operation has been performed, it is regarded that "AEL button (Toggle)" has been selected as a function to be assigned to the custom button 13, and the processing proceeds to step S40.

In step S40, the setting unit 74 configures a setting so that the function of "AEL button (Toggle)" is assigned to the custom button 13, and stores the setting information.

In step S39, if "AEL button (Toggle)" has not been selected as a function to be assigned to the custom button 13, the processing proceeds to step S41.

In step S41, the setting unit 74 controls the operation unit 52 to determine whether or not, for example, the cross key 23 has been operated to give an instruction to end the setting.

If an instruction to end the setting has not been given in step S41, the processing returns to step S33.

That is, the processing of steps S33 to S41 is repeated until an instruction to end the setting is given.

Then, in step S41, if an instruction to end the setting has been given, the processing ends.

By the above processing, either AWBL lock (Hold) or AWBL (Toggle) is assigned to the custom button 13, so that the AWB lock can be implemented.

This makes it possible to assign an AWB lock operation by the hold operation or the AWB lock operation by the toggle operation to the custom button 13.

As a result, it is possible to implement the AWB lock by an operation on the custom button 13, which is independent of an operation on the shutter button 11.

Note that an operation for setting the custom button 13 has been described above, and a similar processing can be used to set the custom button 18.

Furthermore, in the processing described above, four types of functions have been given as examples of a function to be assigned: "AWBL button (Hold)", "AWBL button (Toggle)", "AEL button (Hold)", and "AEL button (Toggle)". The function to be assigned is not limited to these, and other functions may be assigned.

Moreover, a function of a button having another function provided in a main body in advance may be assigned, or a function that does not exist as a physical button may be assigned.

Furthermore, the same function may be assigned to the custom buttons 13 and 18, or different functions may be assigned to each of them.

<AWB Adjustment Processing>

Next, AWB adjustment processing will be described with reference to a flowchart in FIG. 14.

In step S61, the microcomputer 47 controls the operation unit 52 to determine whether or not the AWB has been turned on by, for example, an operation on the front dial 14 or the rear dial 19.

If it is determined in step S61 that the AWB has been turned on by, for example, an operation on the front dial 14 or the rear dial 19, the processing proceeds to step S62.

In step S62, the microcomputer 47 controls the operation unit 52 to determine whether or not, for example, the front dial 14 or the rear dial 19 has been operated to set a display mode to a detailed display mode.

Here, the display mode is a mode in accordance with the amount of information displayed on the liquid crystal monitor 26, and includes the detailed display mode and a normal display mode.

Figure 15:
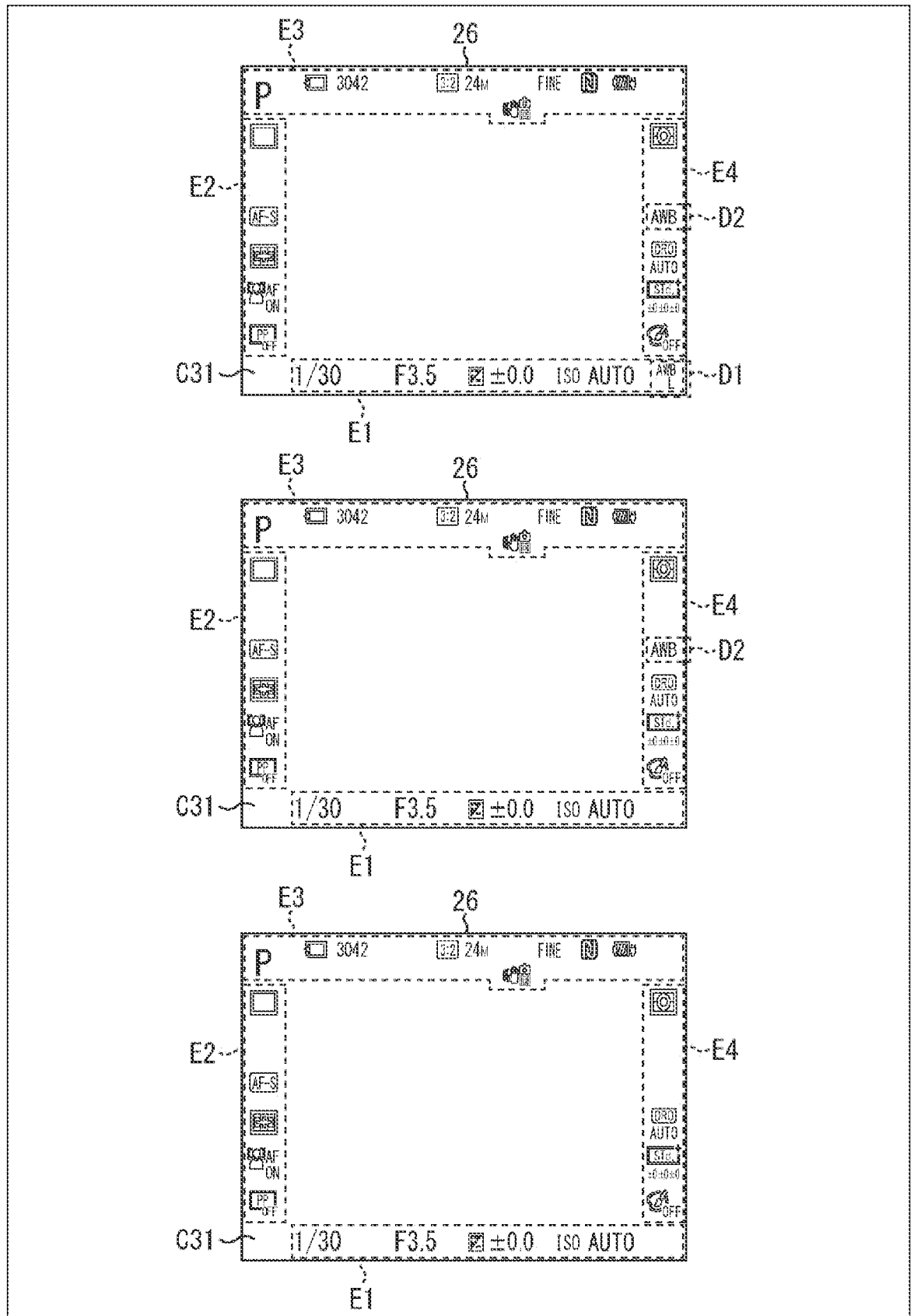
FIG. 15 is a diagram illustrating an example of a display in a detailed display mode.

The detailed display mode is, for example, a display mode as illustrated in the upper part of FIG. 15.

That is, in a case of the detailed display mode, as illustrated in FIG. 15, various types of information are displayed in a lower edge portion E1, a left edge portion E2, an upper edge portion E3, and a right edge portion E4 of the liquid crystal monitor 26.

From the left in the figure, the lower edge portion E1 displays icons indicating each of the shutter speed, the F-number, the exposure, and ISO sensitivity, and also an AWBL icon D1 indicating whether the AWBL button is on or off.

Note that the icon indicating whether the AWBL button is on or off is displayed when the AWBL button is on, and is hidden when the AWBL button is off.

The AWBL icon D1 is displayed when the AWBL has been turned on by the custom button 13 or 18 assigned as an AWBL button, and is not displayed when the AWB lock is applied by a half-press operation on the shutter button 11 or continuous shooting being enabled.

This is because, in a case where the custom button 13 or 18 assigned as an AWBL button is switched on or off by a toggle operation and the AWBL has been turned on by a first full-press operation and then a release operation, when the AWBL has been on for a long time, whether the AWBL is on or off may be forgotten. Thus, the AWBL icon D1 is displayed to allow for visual recognition that the AWBL is on.

In a case where the AWB lock is applied by a half-press operation on the shutter button 11 or continuous shooting being enabled, the color temperature in a live view image stops changing, so that it is possible to visually recognize that the AWB lock has been applied.

In the left edge portion E2, icons indicating each of drive mode, focus mode, metering mode, lock-on focus mode, and picture profile mode are displayed in this order from the top.

From the left in the figure, the upper edge portion E3 displays icons indicating each of imaging mode, remaining battery, aspect ratio, and size of an image to be captured, an icon indicating whether camera shake correction is on or off, an icon indicating image quality, an icon indicating whether or not near field communication (NFC) is enabled, and an icon indicating whether or not charging is in progress are displayed.

In the right edge portion E4, an icon indicating a focus area, an icon D2 indicating whether the AWB is on or off, an icon indicating a dynamic range optimizer (DRO) setting, an icon indicating a creative style mode for image processing, and an icon indicating a picture effect mode are displayed in this order from the top.

Figure 16:
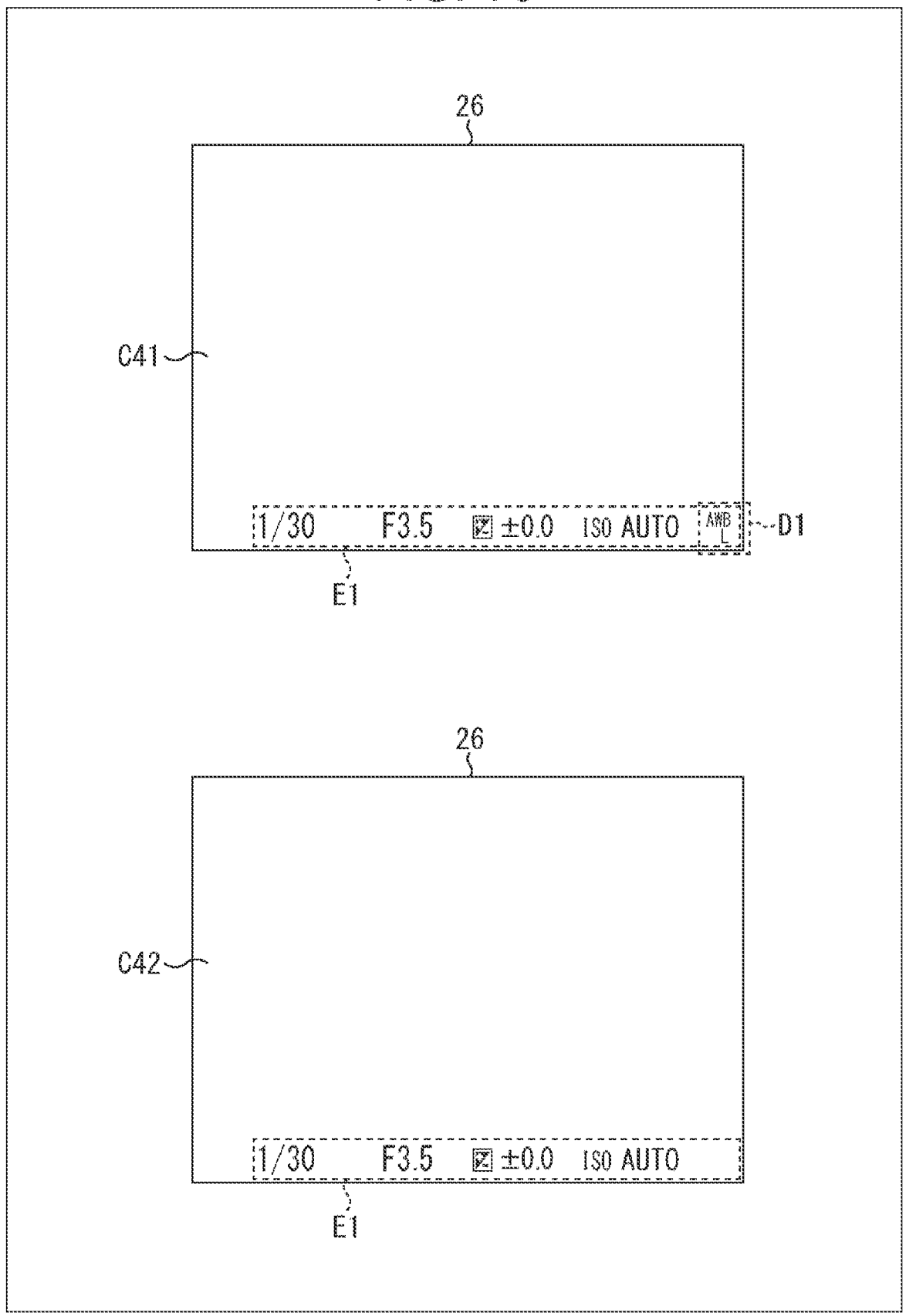
FIG. 16 is a diagram illustrating an example of a display in a normal display mode.

The normal display mode is, for example, a display mode as illustrated in the upper part of FIG. 16. In the detailed display mode in FIG. 15, only the information in the lower edge portion E1 of the liquid crystal monitor 26 is displayed.

That is, in the detailed display mode, the amount of information displayed is larger than that in the normal display mode, which makes it difficult to see the live view image. Therefore, in a case where it is necessary to check a live view image in detail, the normal display mode is used so that less amount of information is displayed, and the live view image becomes easier to see.

Figure 14:
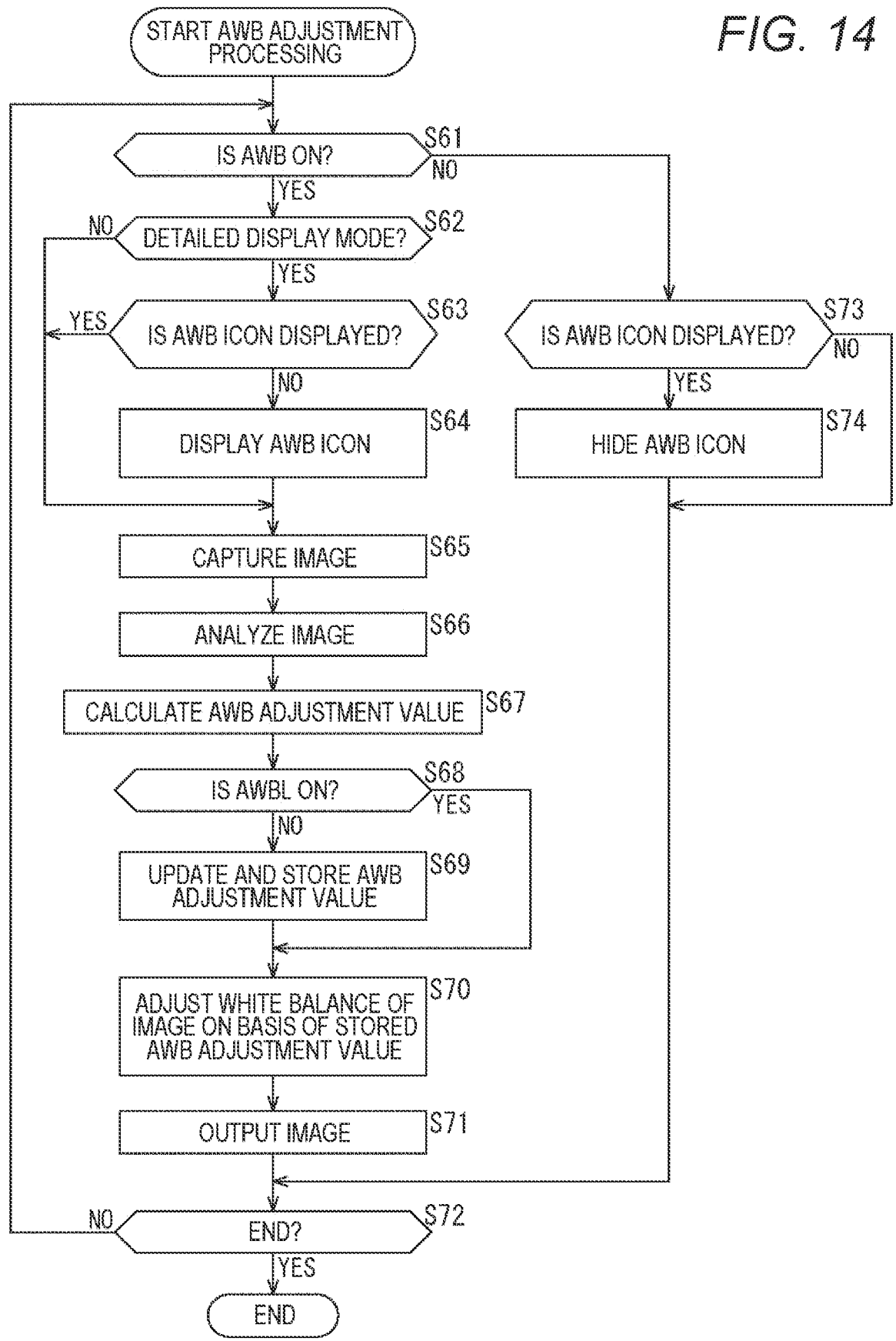
FIG. 14 is a flowchart illustrating AWB adjustment processing.

Now, the description returns to the flowchart in FIG. 14.

If the display mode has been set to the detailed display mode in step S62, the processing proceeds to step S63.

In step S63, the microcomputer 47 determines whether or not the AWB icon D2 is displayed.

If the AWB icon D2 is not displayed in step S63, the processing proceeds to step S64.

In step S64, the microcomputer 47 controls the display unit 50 to display the AWB icon D2 on the liquid crystal monitor 26.

That is, here, in a case where it is determined in steps S61 and S62 that the AWB is on and the display mode has been set to the detailed display mode, but the AWB icon D2 is not displayed as illustrated in the lower part of FIG. 15 in step S63, this contradicts with the operating state.

For this reason, it is necessary to indicate that the AWB is on, and the processing of step S64 is performed to display the AWB icon D2 in the right edge portion E4 of the detailed display mode as illustrated in the upper part of FIG. 15.

Note that if it is determined in step S62 that the display mode is not the detailed display mode, or if the AWB icon D2 has already been displayed in step S63, the processing of step S64 is skipped.

In step S65, the microcomputer 47 controls the image sensor 42 to capture an image on the basis of light in an imaging range incident through the optical system 41, and outputs the image as image data to the image processing unit 43.

The image processing unit 43 performs image processing on the image data, and then outputs the image data to the microcomputer 47.

In step S66, the image analysis unit 71 of the microcomputer 47 analyzes the image on the basis of R, G, and B signals of the image data, and outputs a result of the analysis to the AWB adjustment unit 72.

In step S67, the AWB adjustment unit 72 calculates an AWB adjustment value in accordance with the state of the entire image on the basis of the analysis result of the R, G, and B signals of the image data.

In step S68, the AWB adjustment unit 72 determines whether or not the AWBL is on, that is, whether or not the AWB lock is applied, on the basis of an operation signal from the operation unit 52.

Figure 17:
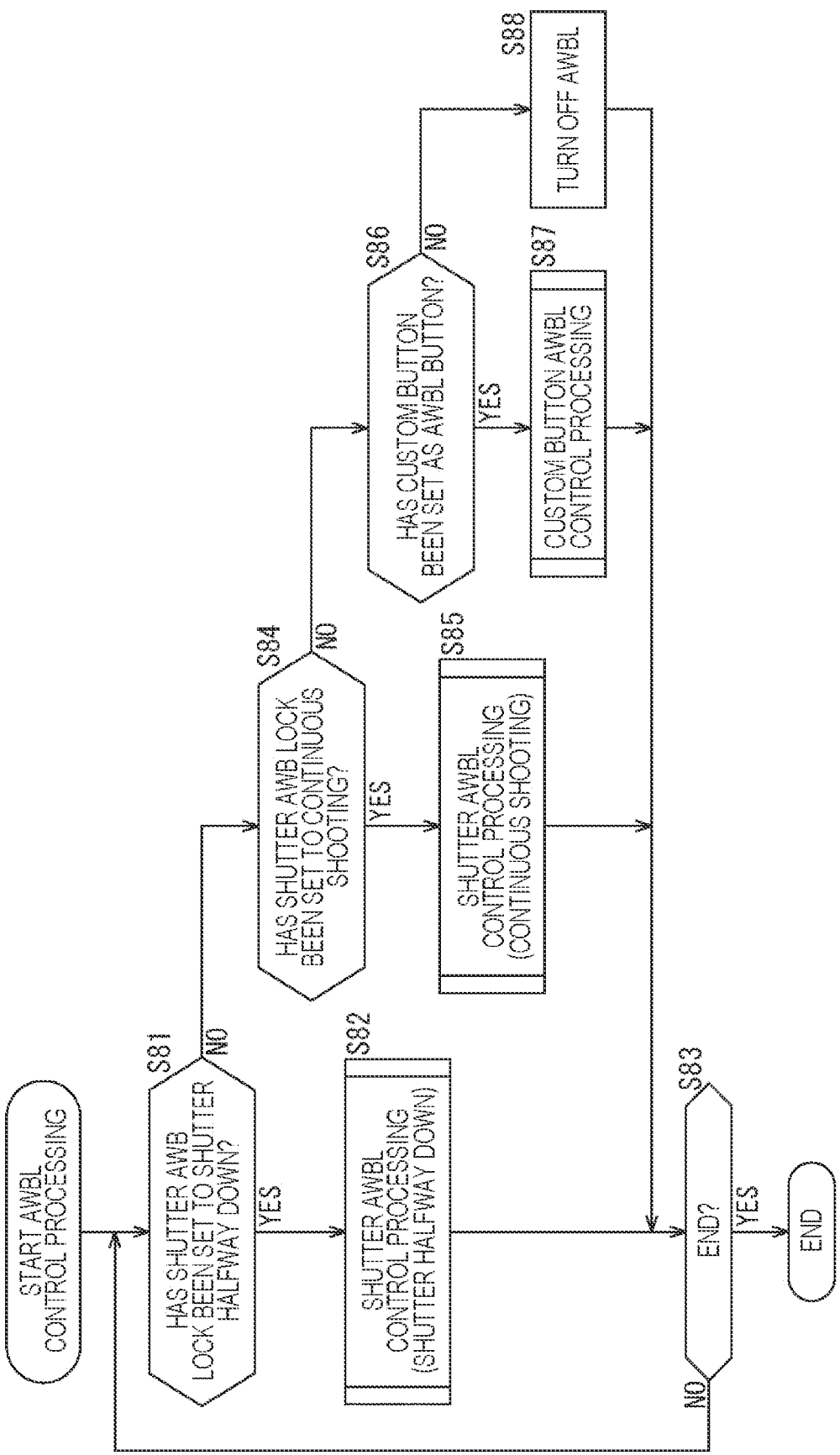
FIG. 17 is a flowchart illustrating AWBL control processing.

Note that processing of obtaining in real time whether the AWBL is on or off is repeated on the basis of the operation signal from the operation unit 52 by AWBL control processing described later with reference to flowcharts in FIGS. 17 to 19.

Thus, the AWB adjustment unit 72 determines whether or not the AWBL is on the basis of the result obtained in real time as to whether the state is on or off, which is a processing result of the AWBL control processing.

If the AWBL is not on in step S68, that is, the AWB lock is not applied, the processing proceeds to step S69.

In step S69, the AWB adjustment unit 72 updates and stores the calculated AWB adjustment value.

In step S70, the AWB adjustment unit 72 adjusts the image data on the basis of the stored AWB adjustment value to adjust the white balance of the image.

In step S71, the microcomputer 47 outputs the image in which the white balance has been adjusted to the image processing unit 43, outputs the image to the display unit 50, and displays the image as a live view image on the liquid crystal monitor 26.

In step S72, the microcomputer 47 determines whether or not an instruction to end the processing has been given. If an instruction to end the processing has not been given, the processing returns to step S61.

Furthermore, in step S68, if the AWBL is on, that is, the AWB lock is applied, the processing of step S69 is skipped.

That is, in a state in which the AWBL is not turned on and the AWB lock is not applied, processing of calculating an AWB adjustment value and updating and storing the calculated AWB adjustment value (processing of step S69) is repeated, and the white balance is continuously adjusted by the AWB adjustment value that is repeatedly updated and stored.

Therefore, in this case, the AWB adjustment value changes in accordance with changes in angle of view and external light, the AWB adjustment value that accompanies the changes is sequentially updated and stored, and the white balance is adjusted by the stored AWB adjustment value, which causes the color temperature of the live view image displayed on the liquid crystal monitor 26 to continue to change.

On the other hand, also in a state in which the AWBL is on and the AWB lock is applied, the AWB adjustment value continues to be calculated, but the processing of updating is not performed (the processing of step S69 is skipped). Thus, the white balance continues to be adjusted by the same AWB adjustment value updated and stored immediately before the AWBL is turned on.

Therefore, in this case, the angle of view and the external light change, the AWB adjustment value changes, and the calculation of the AWB adjustment value that accompanies the change is repeated, but the stored AWB adjustment value is not updated.

Thus, the white balance continues to be adjusted by the same AWB adjustment value stored immediately before the AWBL is turned on, and this causes the color temperature of the live view image displayed on the liquid crystal monitor 26 to remain constant.

Furthermore, if it is determined in step S61 that the AWB is not on, the processing proceeds to step S73.

In step S73, the microcomputer 47 determines whether or not the AWB icon D2 is displayed.

If the AWB icon D2 is displayed in step S73, the processing proceeds to step S74.

In step S74, the microcomputer 47 controls the display unit 50 to hide the AWB icon D2 displayed on the liquid crystal monitor 26, and the processing proceeds to step S72.

Note that if the AWB icon D2 is not displayed in step S73, the processing of step S74 is skipped. Furthermore, in a case where the AWB icon D2 is displayed, it is obvious that the display mode has been set to the detailed display mode, so that the determination as to whether or not the display mode has been set to the detailed display mode is omitted.

By the above processing, in a case where the AWBL is off and the AWB lock is not applied, the color temperature of the image displayed on the liquid crystal monitor 26 continues to be changed by the AWB adjustment value that accompanies a change in incident light due to changes in captured external light and angle of view.

Furthermore, in a case where the AWBL is on and the AWB lock is applied, even in a case where there is a change in incident light due to changes in captured external light and angle of view, the color temperature of the image displayed on the liquid crystal monitor 26 is maintained at a constant color temperature by the white balance adjusted by the same AWB adjustment value stored immediately before the AWBL is turned on.

<AWBL Control Processing>

Next, the AWBL control processing will be described with reference to the flowchart in FIG. 17.

In step S81, the AWB adjustment unit 72 determines whether or not the shutter AWB lock has been set to Shutter Halfway Down on the basis of setting information stored in the setting unit 74.

If it is determined in step S81 that the shutter AWB lock has been set to Shutter Halfway Down, the processing proceeds to step S82.

In step S82, the AWB adjustment unit 72 executes shutter AWBL control processing (Shutter Halfway Down) to execute the shutter AWBL control processing in a case where the shutter AWB lock has been set to Shutter Halfway Down, and controls the AWB lock based on an operation with the shutter button 11 and the custom button 13 or 18. Note that the details of the shutter AWBL control processing (Shutter Halfway Down) will be described later with reference to the flowchart in FIG. 18.

In step S83, the AWB adjustment unit 72 determines whether or not an instruction to end the processing has been given. If an instruction to end the setting has not been given, the processing returns to step S81, and the subsequent processing is repeated.

Furthermore, in step S83, if an instruction to end the processing has been given, the processing ends.

Moreover, if it is determined in step S81 that the shutter AWB lock has not been set to Shutter Halfway Down, the processing proceeds to step S84.

In step S84, the AWB adjustment unit 72 determines whether or not the shutter AWB lock has been set to Continuous Shooting on the basis of the setting information stored in the setting unit 74.

If it is determined in step S84 that the shutter AWB lock has been set to Continuous Shooting, the processing proceeds to step S85.

In step S85, the AWB adjustment unit 72 executes shutter AWBL control processing (Continuous Shooting) to execute the shutter AWBL control processing in a case where the shutter AWB lock has been set to Continuous Shooting, and controls the AWB lock based on an operation with the shutter button 11 and the custom button 13 or 18.

If it is determined in step S84 that the shutter AWB lock has not been set to Continuous Shooting, the processing proceeds to step S86.

In step S86, the AWB adjustment unit 72 determines whether or not the custom button 13 or 18 has been set as an AWBL button on the basis of the setting information stored in the setting unit 74.

If it is determined in step S86 that the custom button 13 or 18 has been set as an AWBL button, the processing proceeds to step S87.

In step S87, the AWB adjustment unit 72 executes custom button AWBL control processing to execute the AWBL control processing in a case where the custom button has been set as an AWBL button, and controls the AWB lock based on an operation with the custom button 13 or 18. Note that the details of the custom button AWBL control processing will be described later with reference to the flowchart in FIG. 19.

If it is determined in step S86 that the custom button 13 or 18 has not been set as an AWBL button, the processing proceeds to step S88.

In step S88, the AWB adjustment unit 72 turns off the AWBL. That is, in this case, neither the shutter button 11 nor the custom button 13 or 18 has been set to perform processing of applying the AWB lock, so that the AWBL is turned off.

By performing the processing described above, whether the AWBL is on or off is managed.

<Shutter AWBL Control Processing (Half-Pressing)>

Next, the shutter AWBL control processing for applying the AWB lock when the shutter is half-pressed will be described with reference to the flowchart in FIG. 18.

In step S101, the AWB adjustment unit 72 determines whether or not the shutter button 11 is half-pressed on the basis of an operation signal from the operation unit 52.

If it is regarded in step S101 that the shutter button 11 is half-pressed, the processing proceeds to step S102.

In step S102, the AWB adjustment unit 72 determines whether or not the AWBL is off. That is, it is determined whether or not the AWBL is off at a timing before the shutter button 11 is half-pressed.

If the AWBL is off in step S102, the processing proceeds to step S103.

In step S103, the AWB adjustment unit 72 turns on the AWBL.

Note that if the AWBL is not off in step S102, that is, if the AWBL is already on, the processing of step S103 is skipped.

In step S104, the AWB adjustment unit 72 determines whether or not the custom button 13 or 18 set as an AWBL button has been turned on.

That is, it is determined whether or not the custom button 13 or 18 set as an AWBL button has been turned on by either a hold operation or a toggle operation that is set as an operation for the custom button 13 or 18.

For example, in a case where the operation has been set to a hold operation, it is determined whether or not the custom button 13 or 18 remains pressed.

Furthermore, in a case where the operation has been set to a toggle operation, it is determined whether or not the custom button 13 or 18 has been pressed for the first time and then released.

If it is determined in step S104 that the AWBL button has been turned on, the processing proceeds to step S105.

In step S105, the AWB adjustment unit 72 determines whether or not the AWBL icon D1 is hidden.

For example, in a case where the display mode has been set to the detailed display mode, when the AWB icon D2 is displayed and the AWBL icon D1 is not displayed as illustrated in the middle part of FIG. 15, it is regarded that the AWBL icon D1 is hidden.

Note that, in a case where both the AWB icon D2 and the AWBL icon D1 are not displayed as illustrated in the lower part of FIG. 15, the AWB is not on, that is, in the case of the middle part of FIG. 15, it is not regarded that the AWBL icon D1 is hidden even though the AWBL icons are hidden.

Furthermore, for example, in a case where the display mode has been set to the normal display mode, when the AWBL icon D1 is not displayed as illustrated in the lower part of FIG. 16, it is regarded that the AWBL icon D1 is hidden.

If it is determined in step S105 that the AWBL icon D1 is hidden, the processing proceeds to step S106.

In step S106, the microcomputer 47 controls the display unit 50 to display the AWBL icon D1 in the lower edge portion E1 on the liquid crystal monitor 26.

For example, in a case where the display mode has been set to the detailed display mode, the AWBL icon D1 is displayed with the AWB icon D2 displayed as illustrated in the upper part of FIG. 15, and it is regarded that the AWBL icon D1 is displayed.

Furthermore, for example, in a case where the display mode has been set to the normal display mode, the AWBL icon D1 is displayed as illustrated in the upper part of FIG. 16, and it is regarded that the AWBL icon D1 is displayed.

Note that if it is determined in step S105 that the AWBL icon D1 is not hidden, that is, the AWBL icon D1 is displayed, the processing of step S106 is skipped.

On the other hand, in step S104, if the AWBL button has not been turned on, that is, the custom button 13 or 18 set as an AWBL button has not been operated and is off, or if the custom button 13 or 18 has not been set as an AWBL button, the processing proceeds to step S107.

In step S107, the AWB adjustment unit 72 determines whether or not the AWBL icon D1 is displayed.

If it is determined in step S107 that the AWBL icon D1 is displayed, the processing proceeds to step S108.

In step S108, the microcomputer 47 controls the display unit 50 to hide the AWBL icon D1 on the liquid crystal monitor 26.

Furthermore, if it is determined in step S107 that the AWBL icon D1 is not displayed, that is, hidden, the processing of step S108 is skipped.

That is, the calculated AWB adjustment value is not updated at a timing when the shutter button 11 is half-pressed so that the AWBL is turned on and then the custom button 13 or 18 set as an AWBL button is turned on.

Thus, at a timing when the shutter button 11 is half-pressed (or continuous shooting is enabled) so that the AWBL is turned on and then the custom button 13 or 18 set as an AWBL button is turned on, the AWBL remains on, the AWB adjustment value is constant, and the color temperature is also constant.

Furthermore, when the shutter button 11 is half-pressed (or continuous shooting is enabled) so that the AWBL is turned on but the custom button 13 or 18 set as an AWBL button is not turned on, or when the custom button 13 or 18 has not been set as an AWBL button, the AWB lock remains being applied, but the AWBL icon D1 is hidden.

If it is determined in step S101 that the shutter button 11 has not been half-pressed, the processing proceeds to step S109.

In step S109, the AWB adjustment unit 72 determines whether or not the custom button 13 or 18 set as an AWBL button has been turned on.

If it is determined in step S109 that the AWBL button has been turned on, the processing proceeds to step S110.

In step S110, the AWB adjustment unit 72 determines whether or not the AWBL has been turned off.

If it is determined in step S110 that the AWBL has been turned off, the processing proceeds to step S111.

In step S111, the AWB adjustment unit 72 turns on the AWBL.

In step S112, the microcomputer 47 controls the display unit 50 to display the AWBL icon D1 on the liquid crystal monitor 26.

Note that if it is determined in step S109 that the AWBL button has not been turned on, the processing proceeds to step S113.

In step S113, the AWB adjustment unit 72 determines whether or not the AWBL has been turned on.

If it is determined in step S113 that the AWBL has been turned on, the processing proceeds to step S114.

In step S114, the AWB adjustment unit 72 turns off the AWBL.

In step S114, the microcomputer 47 controls the display unit 50 to hide the AWBL icon D1 on the liquid crystal monitor 26.

Furthermore, if it is determined in step S113 that the AWBL has not been turned on, that is, the AWBL is off, the processing of steps S114 and S115 is skipped.

That is, in a case where the shutter button 11 is not half-pressed, when the custom button 13 or 18 has been set as an AWBL button, the processing is performed in accordance with an operation on the custom button 13 or 18.

More specifically, when the custom button 13 or 18 is turned on, the AWBL is turned on, and the AWBL icon D1 is displayed by the first processing. Furthermore, when the custom button 13 or 18 is turned off, the AWBL is turned off, and the AWBL icon D1 is hidden by the first processing.

Then, when the custom button 13 or 18 has not been set as an AWBL button, the processing is performed in accordance with an operation on the shutter button 11 regardless of an operation on the custom button 13 or 18.

Figure 18:
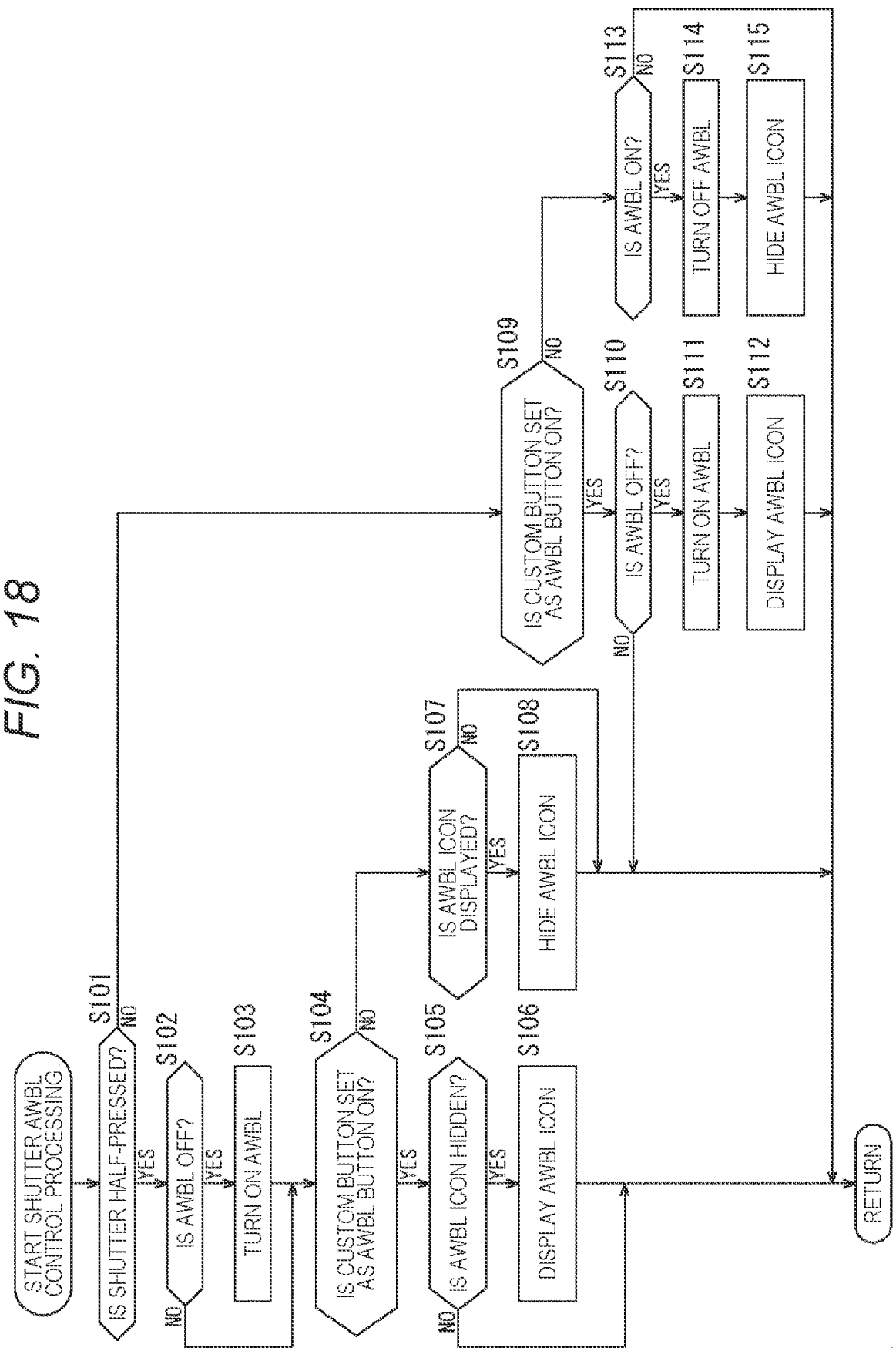
FIG. 18 is a flowchart illustrating shutter AWBL control processing.

Note that, shutter AWBL control processing when the AWB lock is applied during continuous shooting is similar to the processing of the flowchart in FIG. 18 except that processing of determining whether or not the shutter button 11 is continuously being pressed and continuous shooting is enabled (continuous shooting is being performed) is performed as the processing of step S101 instead of the processing of determining whether or not the shutter button 11 is half-pressed, and the description thereof will be omitted.

<Custom Button AWBL Control Processing>

Next, the custom button AWBL control processing will be described with reference to the flowchart in FIG. 19.

Figure 19:
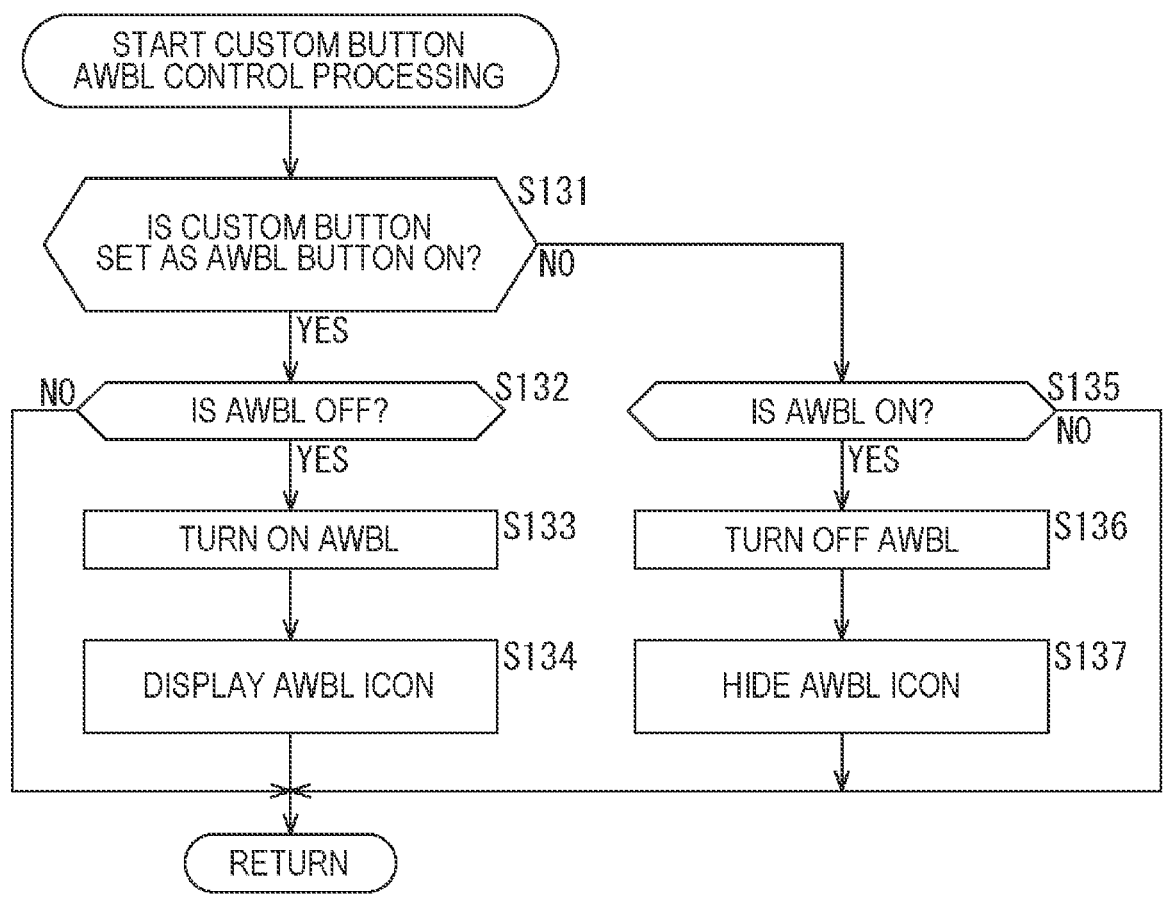
FIG. 19 is a flowchart illustrating custom button AWBL control processing.

Note that the processing of steps S131 to S137 in FIG. 19 is similar to the processing of steps S110 to S116 in the flowchart in FIG. 18, and the description thereof will be omitted.

Operation Example (No. 1)

By the above processing, in a case where the AWBL has been set to be turned on when the shutter button 11 is half-pressed or continuous shooting is enabled and the custom button 13 or 18 has been set as an AWBL button, the operation is as follows.

Figure 20:
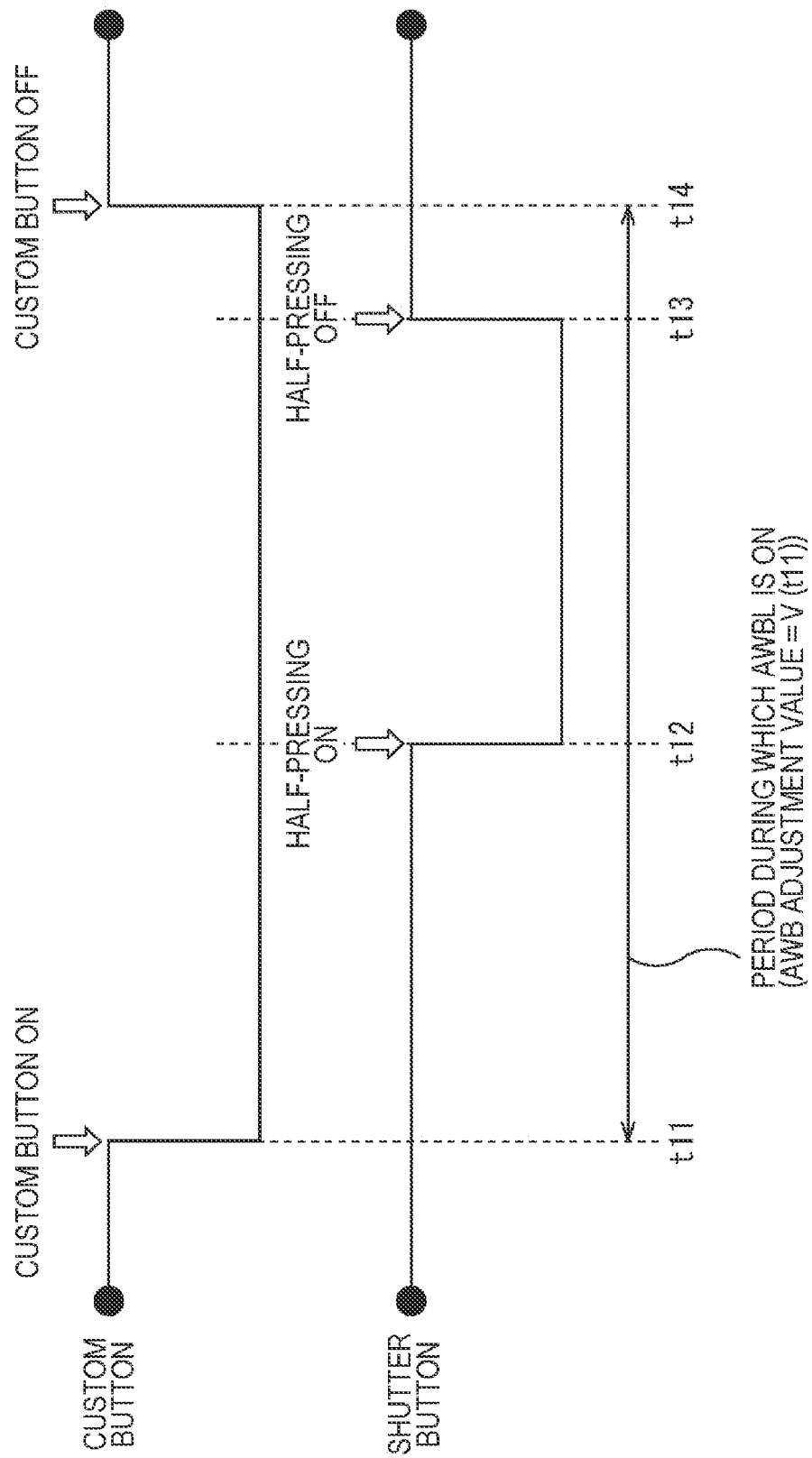
FIG. 20 is a timing chart illustrating an operation example (No. 1).

For example, as illustrated in FIG. 20, at time t11, when the custom button 13 or 18 is turned on (when the custom button 13 or 18 starts to be full-pressed in a case of a hold operation, or when the custom button 13 or 18 is full-pressed for the first time and then released in a case of a toggle operation), the AWBL is turned on.

At this time, the AWB adjustment value obtained immediately before time t11 is not updated and is continuously stored, and the AWB is continuously applied with the same AWB adjustment value (=V (t11)), but the color temperature remains constant.

After that, even if the shutter button 11 is half-pressed or continuous shooting is enabled at time t12, the AWBL continues to be on. Thereafter, the AWBL remains on when the operation on the shutter button 11 ends at time t13.

Then, at time t14, when the custom button 13 or 18 is turned off (when the custom button 13 or 18 that has been pressed is released in a case of a hold operation, or when the custom button 13 or 18 is pressed for the second time and then released in a case of a toggle operation), the AWBL is turned off.

Figure 21:
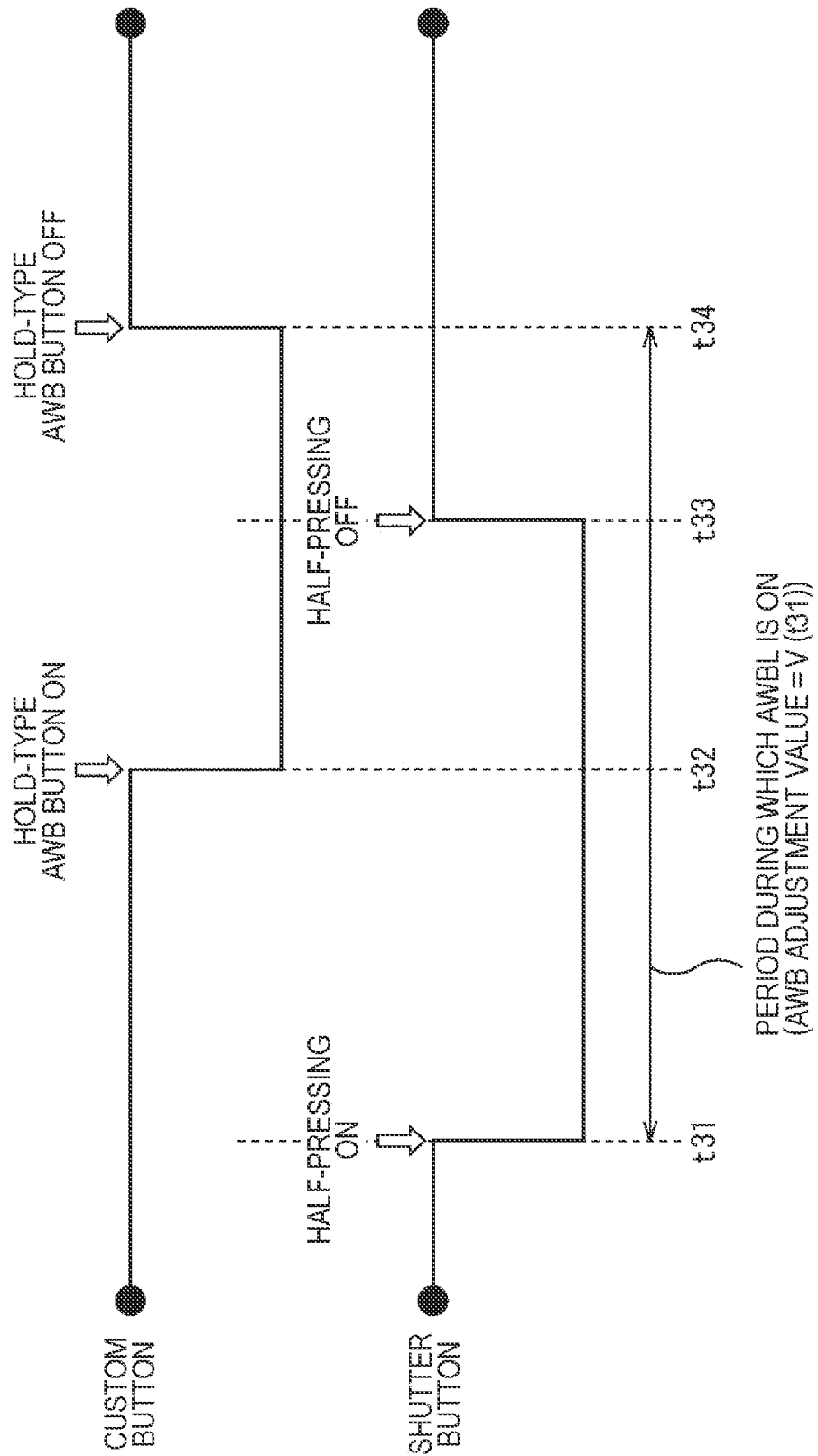
FIG. 21 is a timing chart illustrating an operation example (No. 2).

Note that, in FIGS. 20 and 21, the upper part illustrates the on/off state by the shutter button 11, and the lower part illustrates the on/off state of the custom button 13 or 18 set as an AWBL button. In both parts, "Low" indicates an on state and "Hi" indicates an off state.

That is, in the case of FIG. 20, during the period from time t11 to t14, the AWBL is on and the AWB is continuously applied with the same AWB adjustment value (=V (t11)), so that the color temperature is kept constant.

Operation Example (No. 2)

Furthermore, for example, as illustrated in FIG. 21, the AWBL is turned on when the shutter button 11 is half-pressed or continuous shooting is enabled at time t31.

At this time, the AWB adjustment value obtained immediately before time t31 is not updated and is continuously stored, and the AWB is continuously applied with the same AWB adjustment value (=V (t31)), but the color temperature remains constant.

Thereafter, at time t32, when the custom button 13 or 18 is turned on (when the custom button 13 or 18 starts to be pressed in a case of a hold operation, or when the custom button 13 or 18 is pressed for the first time and then released in a case of a toggle operation), the AWBL continues to be on.

The AWB adjustment value is not updated to the AWB adjustment value (=V (t32)) at the timing when the custom button 13 or 18 is turned on at time t32, but the AWB adjustment value (=V (t31)) that has been obtained, updated, and stored immediately before time t31 continues to be applied.

Thus, at time t32, the AWB adjustment value remains the AWB adjustment value (=V (t31)), and the color temperature becomes constant.

After that, at time t33, the operation on the shutter button 11 ends, but the AWBL remains on.

Then, at time t34, when the custom button 13 or 18 is turned off (when the custom button 13 or 18 that has been pressed is released in a case of a hold operation, or when the custom button 13 or 18 is pressed for the second time and then released in a case of a toggle operation), the AWBL is turned off.

That is, basically, as long as at least one of a half-press operation by the shutter button 11, an operation for enabling continuous shooting, or an operation of turning on the custom button 13 or 18 is performed, the AWBL is turned on.

Furthermore, the AWBL is turned off when both of a half-press operation by the shutter button 11 or an operation for enabling continuous shooting, and an operation of turning on the custom button 13 or 18 are not performed.

Thus, in FIG. 21, the AWBL is on during the period from time t31 to t34, and the AWB is continuously applied with the same AWB adjustment value (=V (t31)), so that the color temperature is kept constant during that period.

3. Second Embodiment

An example in which an imaging operation is performed by the main body of the imaging device 10 has been described above. Alternatively, in addition to the operation by the main body of the imaging device 10, a remote operation may be performed via a communication, for example, by an externally connected personal computer.

Figure 22:
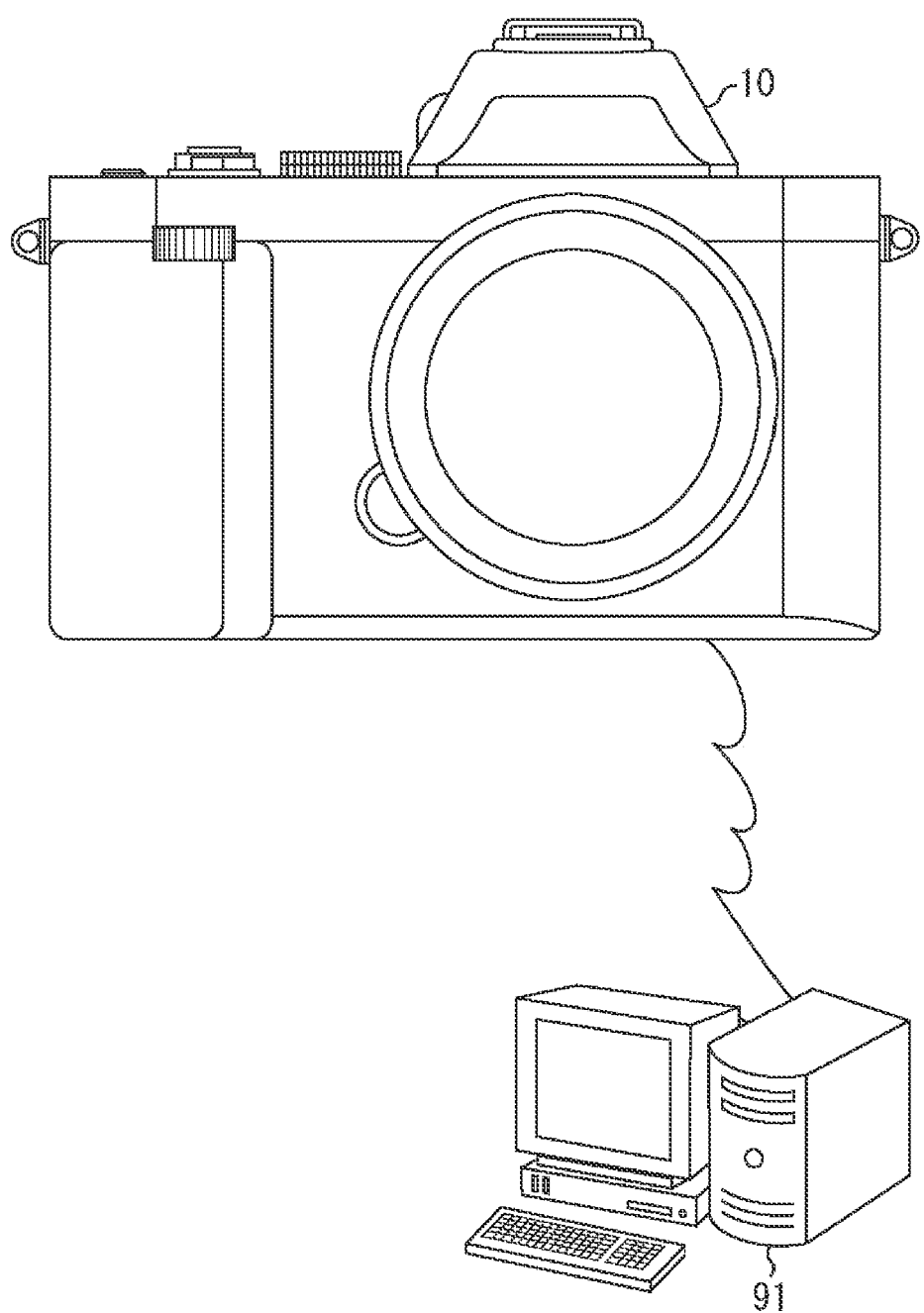
FIG. 22 is a diagram illustrating a configuration example of an imaging system according to a second embodiment to which the present disclosure is applied.

FIG. 22 illustrates a configuration example of an imaging system that can be remotely operated by a personal computer (PC) 91 externally connected to the imaging device 10. The imaging system in FIG. 22 is constituted by the imaging device 10 and the PC 91.

The PC 91 is externally connected to the imaging device 10 by wireless communication or wired communication, and can remotely operate the imaging device 10 by remotely operating a button or the like corresponding to the shutter button 11 or the custom button 13 or 18 of the imaging device 10.

<Configuration Example of PC>

Figure 23:
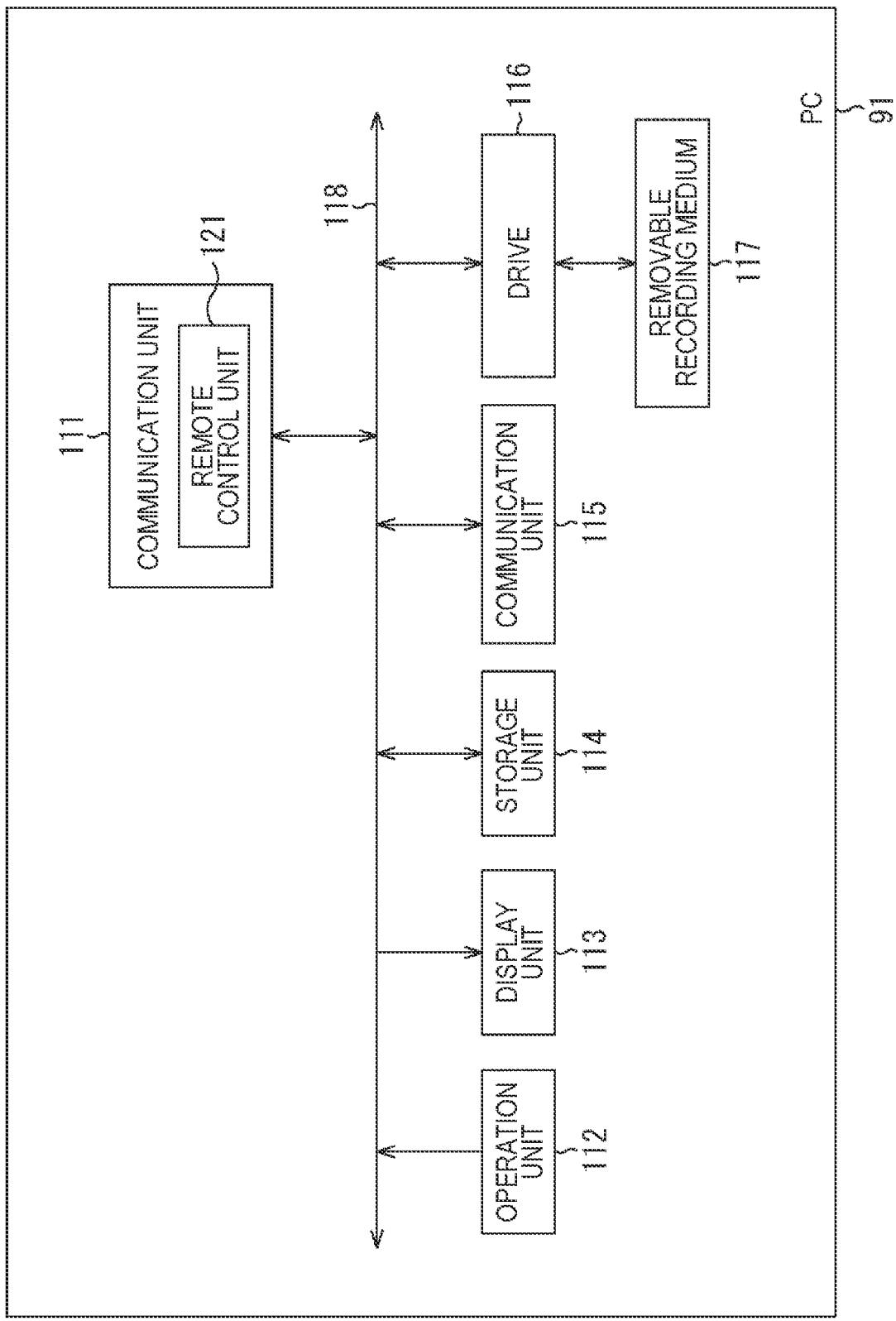
FIG. 23 is a block diagram illustrating a hardware configuration example of a PC in FIG. 22.

Next, a configuration example of the PC 91 will be described with reference to FIG. 23.

The PC 91 includes a control unit 111, an operation unit 112, a display unit 113, a storage unit 114, a communication unit 115, a drive 116, and a removable recording medium 117, which are connected to each other by a bus 118.

The control unit 111 controls the entire operation of the PC 91, and includes a remote control unit 121 for remotely operating the imaging device 10.

The operation unit 112 is constituted by a keyboard, operation buttons, and the like, and accepts a user's operation input, and then outputs an operation signal corresponding to the received operation input to the control unit 111.

The display unit 113 is constituted by a liquid crystal display (LCD) and an organic electro luminescence (EL), and displays various types of information under the control of the control unit 111.

The storage unit 114 is constituted by a hard disc drive (HDD), a solid state drive (SSD), or the like, and reads or writes various types of data and programs.

The communication unit 115 is constituted by a local area network (LAN) adapter, Bluetooth (registered trademark), or the like, and executes communication processing via a network represented by the Internet or short-range communication.

The drive 116 reads and writes data from and to the removable recording medium 117 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The remote control unit 121 controls the communication unit 115 to communicate with the imaging device 10, acquire information regarding an image displayed on the display unit 50 of the imaging device 10, and display the information on the display unit 113.

Furthermore, the remote control unit 121 controls the display unit 113 to display a user interface (UI) image such as the shutter button 11 for remotely operating the imaging device 10.

Then, the remote control unit 121 supplies an operation signal corresponding to an operation signal of the operation unit 52 of the imaging device 10 in accordance with an operation content on the UI image based on the operation signal of the operation unit 112, and implements, by remote operation, an operation similar to that by the shutter button 11 or the custom button 13 or 18 of the imaging device 10.

<Example of Display of UI Image>

Next, an example of a display of a UI image for implementing a remote operation that is displayed by the display unit 113 under the control of the remote control unit 121 will be described with reference to FIG. 24.

Figure 24:
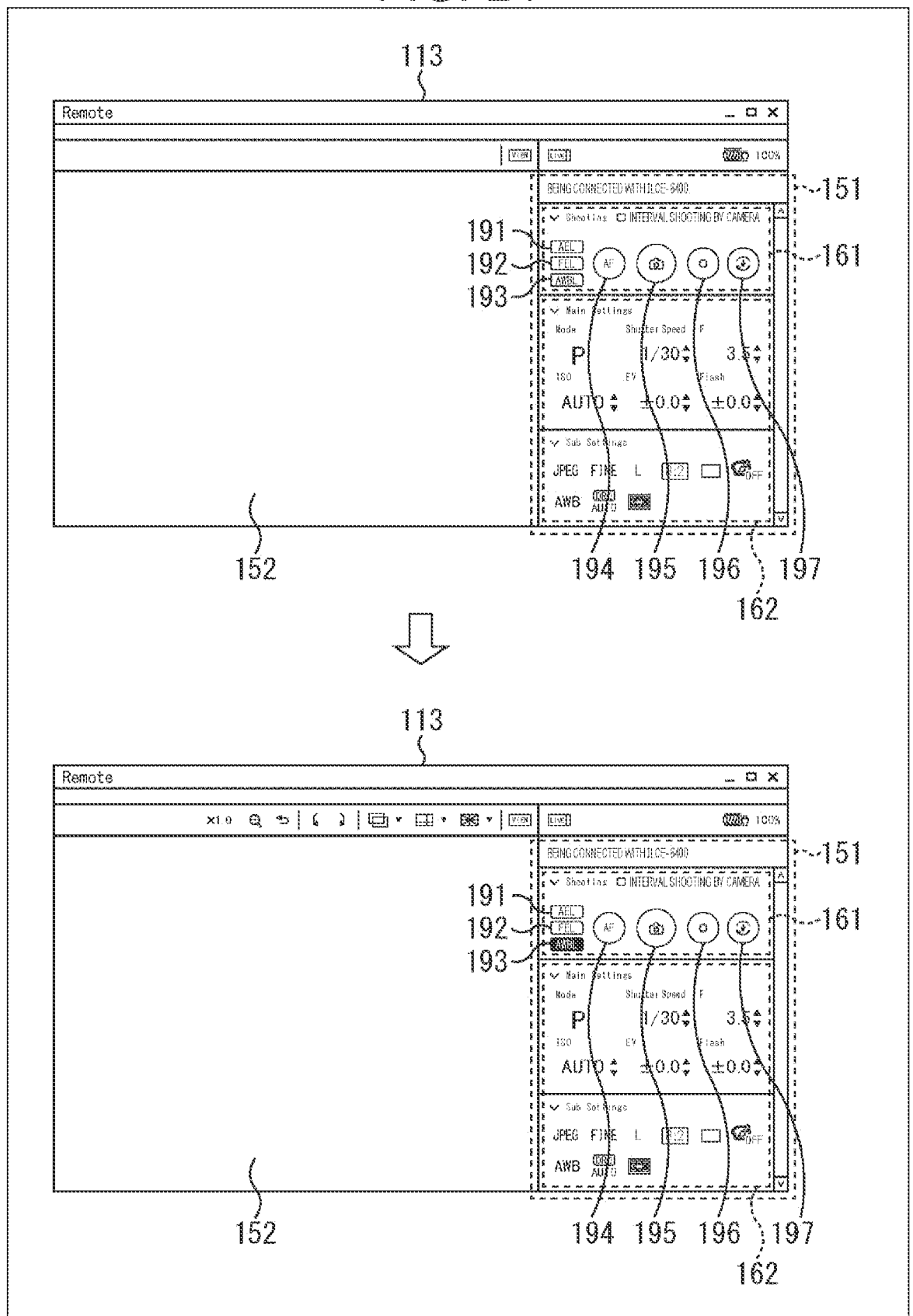
FIG. 24 is a diagram illustrating an example of a display of a UI image.

The UI image is displayed on the display unit 113, for example, as illustrated in the upper part of FIG. 24, and includes an operation panel unit 151 and an image display unit 152.

The operation panel 151 includes an operation block 161 and a setting block 162, and displays buttons necessary for operating the imaging device 10.

In the operation block 161, operation buttons corresponding to the shutter button 11 and the like are arranged, and can be operated by a pointer.

More specifically, the operation block 161 is constituted by an AEL button 191, an FEL button 192, an AWBL button 193, an AF button 194, a shutter button 195, a record button 196, and a timer button 197.

The auto exposure lock (AEL) button 191 is a button operated for fixing an exposure state set by auto exposure (AE).

The flash exposure lock (FEL) button 192 is a button that is operated for fixing the amount of light emitted by a flash and fixing the exposure in accordance with the amount of emitted light.

The auto white balance lock (AWBL) button 193 is a button operated for locking an auto white balance (AWB).

The auto focus (AF) button 194 is a button operated for operating the AF.

The shutter button 195 is a button operated for performing an operation corresponding to a full-press operation on the shutter button 11.

The record button 196 is a button operated for capturing a moving image. The record button 196 changes to a stop button when a moving image recording is started. When the stop button is operated, the moving image recording ends, and the stop button changes back to the record button 196 again.

The timer button 197 is a button used for timer imaging.

All of the AEL button 191 to the timer button 197 can accept only an operation by a pointer corresponding to a pressing operation.

Thus, for example, only a toggle operation can be performed on the AEL button 191, the FEL button 192, and the AWBL button 193, in which the lock is applied by a first operation, and the lock is released by a second operation.

Furthermore, in a case where the custom button 13 or 18 of the imaging device 10 has been set as a toggle operation-based AWBL button, if the AWBL has been turned on by a first operation by the AWBL button 193, the AWBL can be released and changed to an off state by an operation on the custom button 13 or 18 of the imaging device 10.

In a similar manner, in a case where the custom button 13 or 18 of the imaging device 10 has been set as a toggle operation-based AWBL button, if the AWBL has been turned on by a first operation by the custom button 13 or 18 set as an AWBL button, the AWBL can be released and changed to an off state by an operation on the AWBL button 193.

Furthermore, when the lock is applied, the remote control unit 121 controls a UI image displayed by the display unit 113 to change a display color.

For example, the AWBL button 193 is displayed in a predetermined color as illustrated in the lower part of FIG. 24 when the lock is applied by a first operation, and is displayed in its original color as illustrated in the upper part of FIG. 24 when the lock is released by a second operation. As a result, the AWBL button 193 allows a user to visually recognize that the AWB lock is applied.

The setting block 162 is constituted by icons, histogram display fields, and the like that indicate imaging mode, shutter speed, F-number, exposure, ISO sensitivity, drive mode, focus mode, metering mode, lock-on focus mode, focus area, AWB, dynamic range optimizer (DRO), creative style mode for image processing, picture effect mode, and the like.

Each of the icons in the setting block 162 can be selected by a pointer. When an icon is selected, a setting screen (not illustrated) is displayed and a setting can be configured with the user of a pointer, a keyboard, or the like.

A live view image supplied from the imaging device 10 is displayed on the image display unit 152.

Note that since a remote operation is similar to the operation in a case where a toggle operation-type AWBL button has been set to the custom button 13 or 18 of the imaging device 10, description of the AWBL control processing will be omitted.

Furthermore, an example in which all of the AEL button 191 to the timer button 197 accept only a toggle operation has been described above. Alternatively, it is possible to implement a half-press operation in a button operation on a UI image.

It is possible to implement a half-press operation on the shutter button 195 also on the PC 91 that is an external device, in which, for example, when a pointer is moved to the shutter button 195 on the UI image, it is regarded as a half-press operation, and then, when the shutter button 195 is clicked, it is regarded as a full-press operation.

In a case of a remote operation using the PC 91, it is also possible to configure a setting by processing corresponding to shutter AWB setting processing or custom button setting processing, and it is therefore possible to implement an appropriate AWB lock desired by a user.

<Operation in a Case where Two AWBL Buttons are Set>

As described above, in a case where a toggle operation-type AWBL button and a hold operation-type AWBL button are assigned to the custom buttons 13 and 18, respectively, two types of AWBL buttons are assigned.

In a similar manner, in a case of a configuration that allows for remote operation, two AWBL buttons are provided by assigning an AWBL button for a hold operation to either the custom button 13 or 18, in addition to the toggle operation-type AWBL button 193 in the operation block 161 of the operation panel 151 displayed on the display unit 113 in remote operation.

In such a case, an operation can be performed by each of an operation on the two custom buttons 13 and 18, and an operation on the AWBL button 193 on the PC 91 and the custom button 13 or 18.

Figure 25:
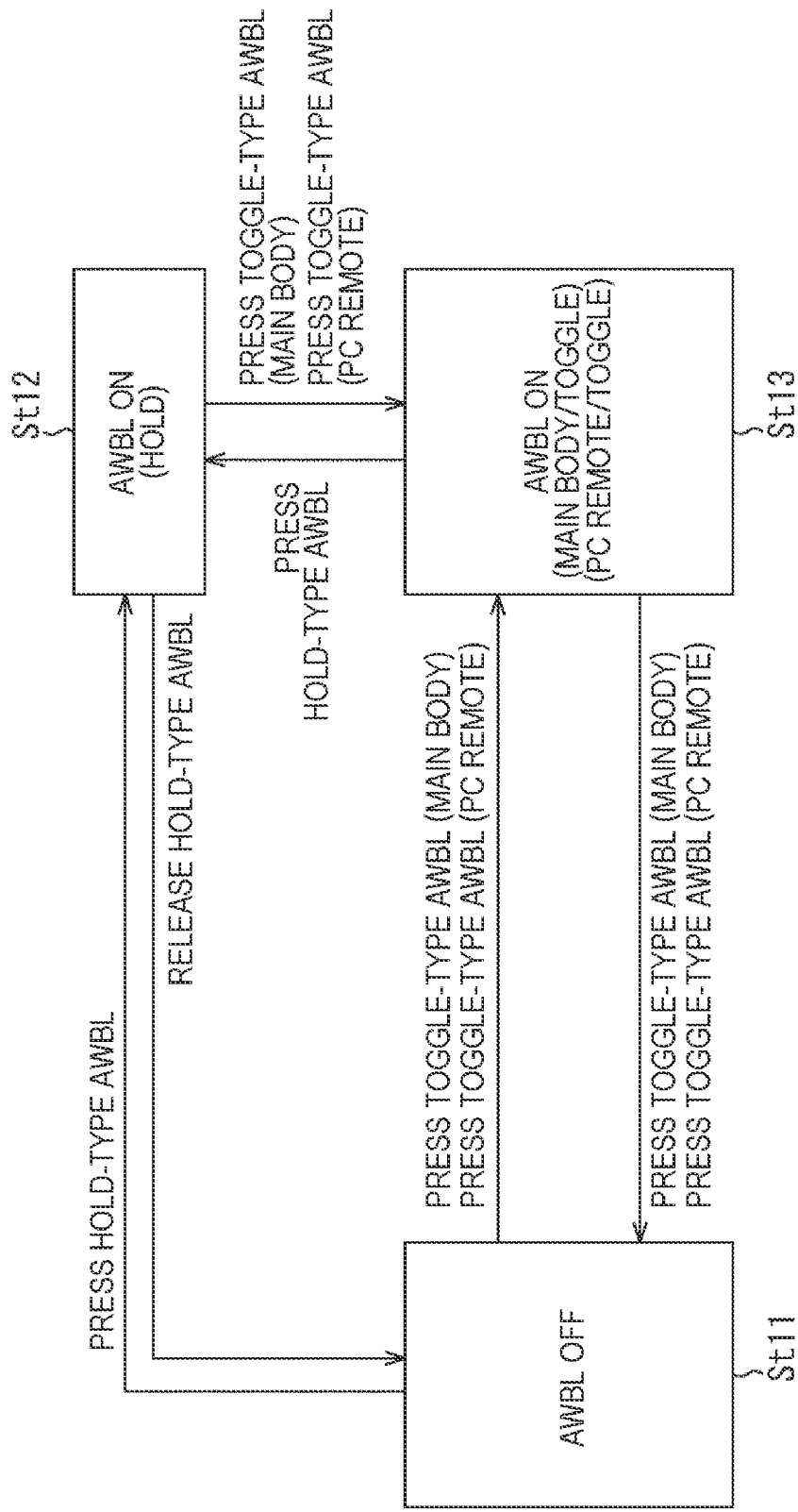
FIG. 25 is a diagram illustrating an operation in a case where two AWBL buttons are set.

However, in this case, as illustrated in FIG. 25, there are three states: a state in which the AWBL is off (state St11), a state in which a hold operation-based AWBL is on (state St12), and a state in which a toggle operation-based AWBL is on (state St13).

Transitions between these states are as illustrated in FIG. 25.

That is, in a state in which the AWBL is off (state St11), when the hold operation-type AWBL button (a button set for the custom button 13 or 18) is operated, a transition from the state to a state in which the hold operation-based AWBL is on (state St12) occurs.

Furthermore, in a state in which the AWBL is off (state St11), when the toggle operation-type AWBL button (a button set for the custom button 13 or 18, or the AWBL button 193) is operated, a transition from the state to a state in which the toggle operation-based AWBL is on (state St13) occurs.

Moreover, in a state in which the hold operation-based AWBL is on (state St12), when the hold operation-type AWBL button (a button set for the custom button 13 or 18) is released, a transition from the state to a state in which the AWBL is off (state St11) occurs.

Furthermore, in a state in which the hold operation-based AWBL is on (state St12), when the toggle operation-type AWBL button (a button set for the custom button 13 or 18, or the AWBL button 193) is operated, a transition from the state to a state in which the toggle operation-based AWBL is on (state St13) occurs.

Moreover, in a state in which the toggle operation-based AWBL is on (state St13), when the hold operation-type AWBL button (a button set for the custom button 13 or 18) is operated, a transition from the state to a state in which the hold operation-based AWBL is on (state St12) occurs.

Furthermore, in a state in which the toggle operation-based AWBL is on (state St13), when the toggle operation-type AWBL button (a button set for the custom button 13 or 18, or the AWBL button 193) is operated (when a second operation is performed), a transition from the state to a state in which the AWBL is off (state St11) occurs.

Such a state transition allows for an on/off control of the AWBL even in a case where two types of AWBL buttons, that is, a hold operation-type AWBL button and a toggle operation-type AWBL button, are set.

As a result, by properly using the two types of AWBL buttons, it is possible to implement an appropriate AWB lock desired by a user.

4. Example of Execution by Software

Incidentally, the series of pieces of processing described above can be executed not only by hardware but also by software. In a case where the series of pieces of processing is executed by software, a program constituting the software is installed from a recording medium into a computer built into dedicated hardware, a general-purpose computer or the like capable of executing various functions with various programs installed therein, or the like.

FIG. 26 illustrates a configuration example of the general-purpose computer. This computer has a built-in central processing unit (CPU) 1001. The CPU 1001 is connected with an input/output interface 1005 via a bus 1004. The bus 1004 is connected with a read only memory (ROM) 1002 and a random access memory (RAM) 1003.

The input/output interface 1005 is connected with an input unit 1006, an output unit 1007, a storage unit 1008, and a communication unit 1009. The input unit 1006 includes an input device such as a keyboard and a mouse used by a user to input an operation command. The output unit 1007 outputs a processing operation screen and an image of a processing result to a display device. The storage unit 1008 includes a hard disc drive or the like for storing programs and various types of data. The communication unit 1009 includes a local area network (LAN) adapter or the like and executes communication processing via a network as represented by the Internet. Furthermore, the input/output interface 1005 is connected with a drive 1010 that reads and writes data from and to a removable recording medium 1011 such as a magnetic disc (including a flexible disc), an optical disc (including a compact disc-read only memory (CD-ROM) and a digital versatile disc (DVD)), a magneto-optical disc (including Mini Disc (MD)), or a semiconductor memory.

The CPU 1001 executes various types of processing according to a program stored in the ROM 1002 or a program that is read from the removable recording medium 1011 such as a magnetic disc, an optical disc, a magneto-optical disc, or a semiconductor memory, installed in the storage unit 1008, and loaded from the storage unit 1008 into the RAM 1003. The RAM 1003 also stores, as appropriate, data or the like necessary for the CPU 1001 to execute various types of processing.

To perform the series of pieces of processing described above, the computer configured as described above causes the CPU 1001 to, for example, load a program stored in the storage unit 1008 into the RAM 1003 via the input/output interface 1005 and the bus 1004 and then execute the program.

The program to be executed by the computer (CPU 1001) can be provided by, for example, being recorded on the removable recording medium 1011 as a package medium or the like. Furthermore, the program can be provided via a wired or wireless transmission medium such as a local area network, the Internet, or digital satellite broadcasting.

Inserting the removable recording medium 1011 into the drive 1010 allows the computer to install the program into the storage unit 1008 via the input/output interface 1005. Furthermore, the program can be received by the communication unit 1009 via a wired or wireless transmission medium and installed into the storage unit 1008. In addition, the program can be installed in advance in the ROM 1002 or the storage unit 1008.

Note that the program to be executed by the computer may be a program that performs the pieces of processing in chronological order as described in the present specification, or may be a program that performs the pieces of processing in parallel or when needed, for example, when the processing is called.

Note that the CPU 1001 in FIG. 26 implements a function of the microcomputer 47 in FIG. 8.

Furthermore, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

Note that embodiments of the present disclosure are not limited to the embodiments described above, and can be modified in various ways within a scope of the present disclosure.

For example, the present disclosure can have a cloud computing configuration in which a plurality of devices shares one function and collaborates in processing via a network.

Furthermore, each step described in the flowcharts described above can be executed by one device or can be shared by a plurality of devices.

Moreover, in a case where a plurality of pieces of processing is included in one step, the plurality of pieces of processing included in that step can be executed by one device or can be shared by a plurality of devices.

Note that the present disclosure can also be configured as described below.

<1> An imaging device including:
an operation member that accepts an input of an operation related to imaging; and
a setting unit that configures a setting in such a way that an auto white balance (AWB) lock is operated by a predetermined operation on the operation member.

<2> The imaging device according to <1>, in which
the operation member is a shutter button.

<3> The imaging device according to <2>, in which
the predetermined operation is a half-press operation on the shutter button.

<4> The imaging device according to <2>, in which
the predetermined operation is a continuous shooting operation by the shutter button.

<5> The imaging device according to <2>, in which
the predetermined operation includes a half-press operation on the shutter button and a continuous shooting operation by the shutter button, and
the setting unit switches between and sets a first shutter button operation mode in which the AWB lock is accepted by a half-press operation on the shutter button, a second shutter button operation mode in which the AWB lock is accepted by a continuous shooting operation by the shutter button, and a third shutter button operation mode in which the AWB lock is not accepted from an operation on the shutter button.

<6> The imaging device according to <5>, in which
the setting unit displays a setting image for selecting the first shutter button operation mode to the third shutter button operation mode, and switches to and sets a shutter button operation mode selected in the setting image.

<7> The imaging device according to any one of <1> to <6>, in which
the operation member is a custom button to which a function for operating an AWB lock is assigned.

<8> The imaging device according to <7>, in which
the predetermined operation is a hold operation that causes the AWB lock to operate while the custom button is full-pressed.

<9> The imaging device according to <7>, in which
the predetermined operation is a toggle operation that causes the AWB lock to operate from when the custom button is full-pressed for a first time and then released until when the custom button is full-pressed for a second time and then released.

<10> The imaging device according to <7>, in which
the setting unit switches between and sets a first custom button operation mode that accepts a hold operation that causes the AWB lock to operate while the custom button is full-pressed, and a second custom button operation mode that accepts a toggle operation that causes the AWB lock to operate from when the custom button is full-pressed for a first time and then released until when the custom button is full-pressed for a second time and then released.

<11> The imaging device according to <10>, in which
the setting unit displays a setting image for selecting from among the first custom button operation mode and the second custom button operation mode, and switches to and sets a custom button operation mode selected in the setting image.

<12> The imaging device according to <7>, further including:
a display unit that displays a captured image in live view,
in which the display unit displays information indicating that the AWB lock is operating in a case where the AWB lock is operated by an operation on the custom button.

<13> The imaging device according to <12>, in which
the display unit displays an icon indicating that the AWB lock is operating in a case where the AWB lock is operated by an operation on the custom button.

<14> The imaging device according to <7>, further including:
an imaging unit that captures an image;
an AWB adjustment value calculation unit that analyzes the image captured by the imaging unit and calculates an AWB adjustment value on the basis of a result of the analysis; and
an AWB adjustment unit that sequentially updates and stores the AWB adjustment value calculated by the AWB adjustment value calculation unit, and applies an AWB to the image on the basis of the stored AWB adjustment value,
in which the AWB adjustment unit stops, in a case where the AWB lock is turned on, an update of the AWB adjustment value calculated by the AWB adjustment value calculation unit each time the image is captured by the imaging unit, and applies an AWB to the image on the basis of the AWB adjustment value stored immediately before the update is stopped.

<15> The imaging device according to <14>, in which
in a case where the AWB lock is turned on by an operation on the custom button, the AWB adjustment unit updates the stored AWB adjustment value with the AWB adjustment value calculated by the AWB adjustment value calculation unit on the basis of the image captured by the imaging unit at a timing when the custom button is operated even in a case where the AWB lock has already been applied, and then stops an update of the AWB adjustment value and applies an AWB to the image on the basis of the AWB adjustment value stored immediately before the update is stopped.

<16> The imaging device according to any one of <1> to <15>, in which
the predetermined operation includes an operation signal from an external device connected by communication.

<17> The imaging device according to <16>, in which
the external device includes:
a display unit that displays a user interface (UI) image; and
an operation unit that accepts an operation input for the UI image,
in which the UI displays an operation button associated with the operation member, and
the AWB lock is controlled in accordance with an operation content for the operation button displayed on the UI.

<18> The imaging device according to <17>, in which
the AWB lock is turned on from a timing when a first operation is performed on the operation button displayed on the UI, and the AWB lock is controlled and turned off at a timing when a second operation is performed.

<19> An imaging method including:
a setting unit that configures a setting in such a way that an auto white balance (AWB) lock is operated by a predetermined operation on an operation member that accepts an input of an operation related to imaging; and setting processing of setting the AWB lock.

<20> A program that causes a computer to function as:

an operation member that accepts an input of an operation related to imaging; and a setting unit that configures a setting in such a way that an auto white balance (AWB) lock is operated by a predetermined operation on the operation member.

REFERENCE SIGNS LIST

10 Image capturing device
11 Shutter button (release button)
13, 18 Custom button
23 Cross key
42 Image sensor
47 Microcomputer
52 Operation unit
71 Image analysis unit
72 AWB adjustment unit
73 WB control unit
74 Setting unit

The invention claimed is:

1. An imaging device, comprising:
a button configured to receive an input of a specific operation related to imaging, wherein
the specific operation corresponds to one of a first operation or a second operation, and
the second operation is different from the first operation; and
a setting unit configured to:
switch between a plurality of operation modes, wherein the plurality of operation modes includes:
a first operation mode in which an auto white balance (AWB) lock is operable by the first operation on the button; and
a second operation mode in which the AWB lock is operable by the second operation on the button; and
control, based on the switch, a setting of the imaging device to set the AWB lock to the specific operation on the button, wherein the setting is controlled such that the AWB lock is operable based on the specific operation.

2. The imaging device according to claim 1, wherein the button is a shutter button.

3. The imaging device according to claim 2, wherein the specific operation includes a half-press operation on the shutter button.

4. The imaging device according to claim 2, wherein the specific operation includes a continuous shooting operation.

5. The imaging device according to claim 2, wherein
the first operation mode corresponds to a first shutter button operation mode,
the second operation mode corresponds to a second shutter button operation mode,
the plurality of operation modes further includes a third shutter button operation mode,
the first operation corresponds to a half-press operation on the shutter button,
the second operation corresponds to a continuous shooting operation, and
the setting unit is further configured to:
switch between and sets the first shutter button operation mode, the second shutter button operation mode, and the third shutter button operation mode, wherein the first shutter button operation mode is in which the AWB lock is operable by the half-press operation on the shutter button,
the second shutter button operation mode is in which the AWB lock is operable by the continuous shooting operation by the shutter button, and
the third shutter button operation mode is in which the AWB lock is not operable from the specific operation on the shutter button; and
set one operation mode of the plurality of operation modes based on the switch between the first shutter button operation mode, the second shutter button operation mode, and the third shutter button operation mode.

6. The imaging device according to claim 5, wherein the setting unit is further configured to:
control display of a setting image for selection of one of the first shutter button operation mode, the second shutter button operation mode, or the third shutter button operation mode]; and
switch to the one of the first shutter button operation mode, the second shutter button operation mode, or the third shutter button operation mode based on the selection in the setting image.

7. The imaging device according to claim 1, wherein the button is a custom button to which a function for operation of the AWB lock is assigned.

8. The imaging device according to claim 7, wherein the specific operation includes a hold operation that causes the AWB lock to operate while the custom button is full-pressed.

9. The imaging device according to claim 7, wherein the specific operation includes a toggle operation that causes the AWB lock to operate from a time at which the custom button is full-pressed for a first time and released until a time at which the custom button is full-pressed for a second time and released.

10. The imaging device according to claim 7, wherein
the first operation mode corresponds to a first custom button operation mode,
the second operation mode corresponds to a second custom button operation mode,
the setting unit is further configured to switch between the first custom button operation mode and the second custom button operation mode,
the first custom button operation mode is in which a hold operation causes the AWB lock to operate while the custom button is full-pressed, and
the second custom button operation mode is in which a toggle operation causes the AWB lock to operate from a time at which the custom button is full-pressed for a first time and released until a time at which the custom button is full-pressed for a second time and released.

11. The imaging device according to claim 10, wherein the setting unit is further configured to:
control display of a setting image for selection of one of the first custom button operation mode or the second custom button operation mode; and
switch to the one of the first custom button operation mode or the second custom button operation mode based on the selection in the setting image.

12. The imaging device according to claim 7, further comprising a display unit configured to:
display a captured image in live view; and display, in a case where the AWB lock is in an operation state based on the specific operation on the custom button, information that indicates that the AWB lock is in the operation state.

13. The imaging device according to claim 12, wherein the display unit is further configured to display, in the case where the AWB lock is in the operation state, an icon that indicates that the AWB lock is in the operation state.

14. The imaging device according to claim 7, further comprising:
   an imaging unit configured to capture an image;
   an AWB adjustment value calculation unit configured to:
      analyze the captured image; and
      calculate an AWB adjustment value based on a result of the analysis of the captured image; and
   an AWB adjustment unit configured to:
      sequentially update the calculated AWB adjustment value;
      sequentially store the updated AWB adjustment value;
      apply an AWB to the captured image based on the stored AWB adjustment value;
      stop, in a case where the AWB lock is in a turned on state, the update of the calculated AWB adjustment value each time the image is captured; and
      apply an AWB to the captured image based on the AWB adjustment value stored immediately before the update is stopped.

15. The imaging device according to claim 14, wherein in the case where the AWB lock is in the turned on state based on the specific operation on the custom button:
   the AWB adjustment value calculation unit is further configured to calculate, at a timing at which the custom button is operated, the AWB adjustment value based on the captured image;
   the AWB adjustment unit is further configured to:
      update the stored AWB adjustment value with the AWB adjustment value calculated at the timing at which the custom button is operated;
      stop the update of the AWB adjustment value; and
      apply an AWB to the captured image based on the AWB adjustment value stored immediately before the update is stopped.

16. The imaging device according to claim 1, wherein the specific operation includes an operation signal from an external device, and
   the imaging device is communicably connected to the external device by communication.

17. The imaging device according to claim 16, wherein the external device includes:
   a display unit that displays a user interface (UI) image, and
   an operation unit that accepts an operation input for the UI image,
   the UI displays an operation icon associated with the button, and
   the AWB lock is controllable based on an operation content for the operation icon displayed on the UI.

18. The imaging device according to claim 17, wherein the AWB lock is turned on from a timing at which a third operation is performed on the operation icon displayed on the UI, and
   the AWB lock is controlled and turned off at a timing at which a fourth operation is performed on the operation icon.

19. An imaging method, comprising:
   receiving an input of a specific operation on a button, wherein
      the specific operation is related to imaging,
      the specific operation corresponds to one of a first operation or a second operation, and
      the second operation is different from the first operation;
   switching between a plurality of operation modes, wherein the plurality of operation modes includes:
      a first operation mode in which an auto white balance (AWB) lock is operable by the first operation on the button; and
      a second operation mode in which the AWB lock is operable by the second operation on the button; and
   controlling a setting to set, based on the switch, the AWB lock to the specific operation on the button, wherein the setting is controlled such that the AWB lock is operable based on the specific operation.

20. A non-transitory computer-readable medium having stored thereon computer-executable instructions that, when executed by a processor, cause the processor to execute operations, the operations comprising:
   receiving an input of a specific operation on a button, wherein
      the specific operation is related to imaging,
      the specific operation corresponds to one of a first operation or a second operation, and
      the second operation is different from the first operation;
   switching between a plurality of operation modes, wherein the plurality of operation modes includes:
      a first operation mode in which an auto white balance (AWB) lock is operable by the first operation on the button; and
      a second operation mode in which the AWB lock is operable by the second operation on the button; and
   controlling a setting to set, based on the switch, the AWB lock to the specific operation on the button, wherein the setting is controlled such that the AWB lock is operable based on the specific operation.

21. An imaging device, comprising:
   a setting unit configured to control a setting of the imaging device such that an auto white balance (AWB) lock is operable based on a continuous shooting operation.

22. An imaging device, comprising:
   an operation member configured to receive an input of a specific operation related to imaging, wherein
   the operation member is a shutter button,
   the specific operation includes a half-press operation and a continuous shooting operation; and
   a setting unit configured to:
      switch between:
         a first shutter button operation mode in which an auto white balance (AWB) lock is operable by the half-press operation on the shutter button,
         a second shutter button operation mode in which the AWB lock is operable by the continuous shooting operation by the shutter button, and
         a third shutter button operation mode in which the AWB lock is not operable from the specific operation on the shutter button; and
      control, based on the switch, a setting such that the AWB lock is operable based on the specific operation.

23. An imaging device, comprising:
   an operation member configured to receive an input of a specific operation related to imaging, wherein the operation member is a custom button assigned with operation of an auto white balance (AWB) lock; and a setting unit configured to:
- switch between:
  - a first custom button operation mode in which a hold operation causes the AWB lock to operate while the custom button is full-pressed, and
  - a second custom button operation mode in which a toggle operation causes the AWB lock to operate from a time at which the custom button is full-pressed for a first time and released to a time at which the custom button is full-pressed for a second time and released; and
- control, based on the switch, a setting such that the AWB lock is operable based on the specific operation.

* * * * *